US007908398B2

(12) United States Patent
Grow et al.

(10) Patent No.: US 7,908,398 B2
(45) Date of Patent: Mar. 15, 2011

(54) SOFTWARE, METHOD AND SYSTEM FOR DATA CONNECTIVITY AND INTEGRATION HAVING TRANSFORMATION AND EXCHANGE INFRASTRUCTURE

(75) Inventors: John Darwin Grow, Palm Coast, FL (US); Scott Michael Sirdevan, Green Cove Springs, FL (US); Paul Allan Sisco, Middleburg, FL (US); Paul Robert Beck, Jr., Jacksonville, FL (US); Edward Reed Ludke, Jacksonville, FL (US); Matthew Aloysius Calderaro, Jacksonville, FL (US)

(73) Assignee: Object Innovation, Inc., Jacksonville, FL (US)

( * ) Notice: Subject to any disclaimer, the term of this patent is extended or adjusted under 35 U.S.C. 154(b) by 426 days.

(21) Appl. No.: 11/947,804

(22) Filed: Nov. 30, 2007

(65) Prior Publication Data
US 2008/0133768 A1 Jun. 5, 2008

Related U.S. Application Data

(60) Division of application No. 10/457,832, filed on Jun. 9, 2003, now Pat. No. 7,325,027, which is a continuation-in-part of application No. 10/456,293, filed on Jun. 6, 2003, now abandoned.

(60) Provisional application No. 60/387,097, filed on Jun. 7, 2002.

(51) Int. Cl.
*G06F 15/16* (2006.01)
(52) U.S. Cl. ........................................ 709/246; 709/201
(58) Field of Classification Search .......... 709/201–205, 709/217–219, 227–234, 246
See application file for complete search history.

(56) References Cited

U.S. PATENT DOCUMENTS

| 5,982,893 | A  | * | 11/1999 | Hughes .......................... 705/75 |
| 6,240,186 | B1 |   | 5/2001  | Hyde |
| 6,516,353 | B1 |   | 2/2003  | Richards |
| 6,772,413 | B2 | * | 8/2004  | Kuznetsov .................... 717/136 |

(Continued)

OTHER PUBLICATIONS

Salesforce.com® web site information as of Aug. 4, 2004 from http://www.salesforce.com/us/.

(Continued)

*Primary Examiner* — Yasin Barqadle
(74) *Attorney, Agent, or Firm* — Foley & Lardner LLP

(57) ABSTRACT

Software, methods, and system for data connectivity and integration having a transformation and exchange gateway are provided. The transformation and exchange gateway software is stored in a memory and has a mapper to map connection data path instructions, a plurality of inbound templates each to provide inbound data processing instructions for an inbound data set having an inbound data interchange protocol, at least one outbound template to provide outbound data processing instructions for an outbound data set having an outbound date interchange protocol different from the inbound data interchange protocol, and a data transformation and exchange engine in communication with the mapper to locate a data path and determine a select one of the plurality of inbound templates to use for inbound data processing instructions, in communication with the select one of the plurality of inbound templates to process the inbound data set responsive to the inbound data processing instructions of the select one of the plurality of inbound templates and thereby transform the inbound data set to the outbound data set, and in communication with the at least one outbound template to send the outbound data set with the outbound data interchange protocol responsive to the outbound data processing instructions of the at least one outbound template.

18 Claims, 28 Drawing Sheets

U.S. PATENT DOCUMENTS

| | | | |
|---|---|---|---|
| 6,789,252 B1 * | 9/2004 | Burke et al. | 717/100 |
| 6,912,522 B2 | 6/2005 | Edgar | |
| 7,634,726 B2 * | 12/2009 | Ims et al. | 715/249 |
| 2003/0037100 A1 | 2/2003 | Olejar | |
| 2003/0061385 A1 | 3/2003 | Gonze | |

OTHER PUBLICATIONS

"Pathfinder" Orion Consulting Ltd., 'Online! Aug. 5, 2001, pp. 1-4, Retrieved Mar. 4, 2004 from URL:http://web.archive.org/web/20010805182208/http://www.orionltd.co.uk/products/pathfinder.htm.

"Softshare and eBRIDGE Software, Inc. combine Their E-Business Intergration Expertise" SOFTSHARE.COM 'Online! Jun. 27, 2001, pp. 1-3. Retrieved Mar. 11, 2004 from URL:http://web.archive.org/web/20020106155932/http://www.softshare.com/news/010705/asp.

"iWay Adaptor for Oracle E-Business Suite" IWAY Softshare, 'Online!, Jun. 2, 2002 pp. 1-3. Retrieved Mar. 11, 2004 from URL:http://web.archive.org/web/20020602061057/http://www.iwaysoftware.com/products/adapters/oracle_e-Biz.html.

* cited by examiner

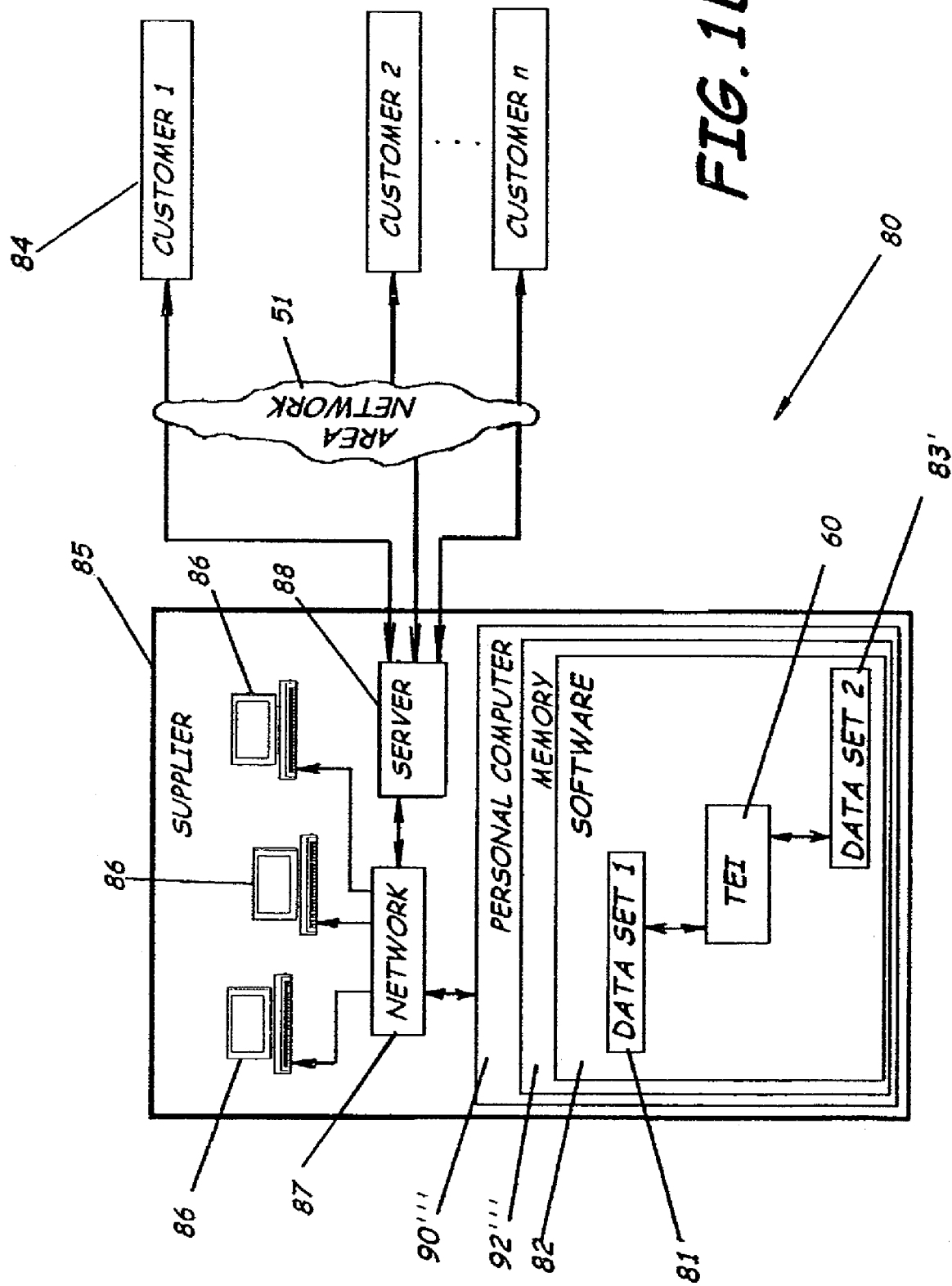

MANAGE OUTBOUND TEMPLATE

TEMPLATE HEADER

- TEMPLATE HEADER
- GLOBAL FIELD TYPE VALUES
- GLOBAL SUBSTITUTIONS
- INBOUND DEPENDENCIES
- OUTBOUND RECORDS

DATA TYPE: XML
FIELD DELIMITER:
RECORD DELIMITER: CRLF

DATA TYPE:
EDI X12
CSV (COMMA SEPERATED VALUE)
DATABASE
DELIMITED
EDI X12
EXCEL
FIXED LENGTH
NVP (NAMED VALUE PAIR)
SERVLET

ONE AT A TIME
☑ QUOTE ALL DATA
☑ TRIM ALL DATA
☑ KEEP ORIGINAL DATA ON CONVERSION ERROR
☐ SEND DATA IF BODY IS EMPTY

*FIG. 21B*

| DATA SHEET | SERVICES | CONTACT | LOGIN/SIGNUP |

→ LOGIN

SIGN-UP!
IF YOU DO NOT HAVE AN ACCOUNT YOU CAN SIGN-UP ON LINE AND START USING IN A FEW MOMENTS.
OR...
ENTER YOUR LOGIN AND PASSWORD BELOW TO GAIN ACCESS TO YOUR ACCOUNT

LOGIN: [    ]
PASSWORD: [    ]
[LOGIN]
SIGN UP FOR A NEW ACCOUNT.

FIG. 26

| TRANSACTIONS | USER MANAGEMENT | SCHEDULES | SUPPORT | LOGOUT/HOME |

TRANSACTION SEARCH

→ WELCOME!      USER: XXXXX      ACCOUNT: XXXXX

WELCOME XXXXX

AVAILABLE OPTIONS

[USER MANAGEMENT]
[SCHEDULES]
[SUPPORT]
[DOWNLOAD]

FIG. 27

| TRANSACTIONS | USER MANAGEMENT | SCHEDULES | SUPPORT | LOGOUT/HOME |
|---|---|---|---|---|

➡ ACCOUNT MANAGEMENT

WELCOME XXXXX    USER: XXXXX    ACCOUNT: XXXXX

VIEW ACCOUNTS | CREATE AN ACCOUNT | VIEW ALL USERS | CREATE A USER | ACCOUNT HISTORY

MODIFY ACCOUNT INFORMATION BY SELECTING THE MODIFY/VIEW LINK FOR THE ACCOUNT.

| DELETE | VIEW/MODIFY | ACCOUNT NAME | COMPANY/ENTITY | STATUS | VIEW/MODIFY USER |
|---|---|---|---|---|---|
| X | ✎ | xx001 | ABC CONSULTING | ACTIVE | ✎ |
| X | ✎ | xx002 | ABC CONSULTING | ACTIVE | ✎ |
| X | ✎ | xx003 | ABC CONSULTING | ACTIVE | ✎ |
| X | ✎ | xx004 | ABC CONSULTING | INACTIVE | ✎ |
|   |   | yy021 | UBER HOUSE | INACTIVE | ✎ |
|   | ✎ | yy022 | UBER HOUSE | ACTIVE | ✎ |

*FIG. 28*

SOFTWARE, METHOD AND SYSTEM FOR DATA CONNECTIVITY AND INTEGRATION HAVING TRANSFORMATION AND EXCHANGE INFRASTRUCTURE

RELATED APPLICATIONS

This is a divisional of U.S. Non-Provisional Patent Application Ser. No. 10/457,832 filed on Jun. 9, 2003 now U.S. Pat. No. 7,325,027 which is a continuation in part of U.S. Non-Provisional Application Ser. No. 10/456,293 filed on Jun. 6, 2003 now abandoned, which claims the priority of provisional patent application U.S. Ser. No. 60/387,097, filed Jun. 7, 2002, and titled "System, Method and System for Electronic Data Interchange Among Multiple Data Sources," each of which are incorporated herein by reference in their entireties.

BACKGROUND OF THE INVENTION

1. Field of the Invention

The present invention is related to the fields of data interchange systems and data connectivity and integration and related software and methods.

2. Description of Related Art

Communication and connectivity between disparate entities has been a significant technical and financial challenge for the past thirty years. Over the years, electronic data interchange ("EDI") formats and standards have emerged to communicate between data interchange systems of these disparate entities or sources in an effort to bring method and order to the process. For example, disparate entities often exchange documents that conform to EDI standards in efforts to streamline communication between the entities. Entities often buy software that provides the functionality needed to translate data to an EDI format for further processing at another computer system. Even with the development of Edi protocols, however, each implementation of these systems still often requires individual and customized work to adapt to each "node" in a communications network so that the entities can communicate effectively. This custom approach, however, is expensive, time-consuming and static (requiring modification as a result of each and every change).

Recently, various enhanced protocols and standards, such as XML and newer EDI standards, were developed to accommodate today's explosive e-business environment. Even so, there are still multiple standards, and there are nuances within almost every business entity and application so that effective data interchange between entities, sources or applications still remains extremely expensive and time-consuming to implement.

For example, an administrator of at least one of these entities, sources, or application often manually performs various tasks required to prepare a data set or file for transfer and processing on another computer system which is often remote. Likewise, an administrator at the receiving computer system often performs many tasks to process the received data. The administrator, for example, can manipulate copy, append, create, delete, or perform various other functions on files depending on the condition or requirements of the data or documents to be transferred or received. Also, the administrator can encrypt, compress, or translate the data to another format. Further, the administrator often maps data from one format to another and performs tasks to complete the transfer or receipt of a data set or file to and from another computer system. These administrators also often create scripts or instruction sets to assist them in performing various tasks. These functions by the administrator can be time consuming and expensive as complexities related to a plurality of different entities interfacing with one company have different data formats, standards, or protocols. These complexities often require teams of analysts at a customer, for example, and a team of analysts at a supplier or distributor to try to address the data connectivity issues between the entities.

More recently, software has emerged in attempts to address some of these problems. Applicants, however, recognize that many software companies are focusing only on the very expensive, top-tier implementations. They build software modules that "plug-in" between specific, popular commercial software applications, and have additional tools to address disparate communication environments. Although these companies can be somewhat successful in facilitating working environments, they can easily cost millions of dollars to implement, and take several months (to over a year) to complete. They require the services of trained systems integrators to manage and facilitate their installation.

For example, many conventional approaches for addressing disparate data interchange generally set a proposed solution on top of some existing data "standard" such as a particular version of EDI such as X12, some version of XML such as ebXML, or some other proprietary data format. Applicants recognize this as being problematic in that invariably entities wanting to connect electronically to another company often have to adopt that other entity's data "standard" whether it is convenient or not. Applicants recognize that this problem is like getting 12 people into a room, all of whom speak different languages, and trying to decide how to communicate with one another.

SUMMARY OF INVENTION

In view of the foregoing, embodiments of the present invention advantageously provide a system, software, and methods for data connectivity and integration that facilitate fast and accurate transformation and exchange of data among a plurality of entities, sources, or applications. Embodiments of a system, software and methods for data connectivity and integration of the present invention advantageously identify a communication data format or connectivity protocol and translate or transform it to its connected applications. Embodiments of a system and software for data connectivity and integration of the present invention are also adaptable to predictable future formats that may come into practice, and can perform these functions in near real-time. Because embodiments of a system and software for data connectivity and integration of the present invention operate as a translator, these embodiments do not rely on a limited set of pre-determined modules. Embodiments of a system, software and methods for data connectivity and integration of the present invention further advantageously adopts easily to a very large number of entities, sources, or applications and, therefore, require little time or investment to implement. Embodiments of a system, software and methods for data connectivity and integration of the present invention still further advantageously were developed as a powerful, open approach to data connectivity and leverage the capabilities of existing standards, such as EDI, XML and Java, to manipulate, transform, and exchange electronic data transparently and accurately.

Embodiments of software, methods, and system for data connectivity and integration of the present invention advantageously can target various environments including, but not limited to, the following:

(a) One to One: From one entity or company to another (i.e., between a parent company's software and that of its subsidiary);

(b) One to Many: From one company to multiple companies (i.e., between a wholesale distributor, and its suppliers and distributors);

(c) Many to Many: Within group entities (i.e., a commerce exchange between suppliers, distributors, retail outlets and service providers); and (d) Intra-company: From one company's software application to its other applications(s) (i.e., between a company's e-commerce application and its Inventory Management application).

Embodiments of a system and software for data connectivity and integration have a transformation and exchange infrastructure (TEI) that takes incoming data (from any source using any protocol) and transforms it into a form that can be read and understood natively by the destinations(s). The TEI of the present invention advantageously has two parts: the exchange part where data from various sources are sent to various destinations; and the transformation part were the data is manipulated and transformed so that a first data protocol coming from the source is properly turned into a second data protocol by the time it reaches the destination. TEI is an infrastructure in that TEI is broader than a single application, but narrower than an operating system. TEI has the capability of effectively working in both arenas and is not limited to a single area.

More particularly, embodiments of the present invention provide a system for data connectivity and integration that includes a first computer defining a first server. The first server has a first memory, a first data set stored therein, and a first data interchange protocol. A first area network is in communication with the server, and a plurality of remote data terminals is in communication with the first server through the first area network by the first data interchange protocol. At least one remote data terminal of the plurality of remote data terminals has data terminal memory associated therewith. A second area network is in communication with the first server and the at least one remote data terminal. A second computer remote from the first server is in communication with the second area network and defines a second server. The second server has a second memory, a second data set stored therein, and a second data interchange protocol. A third computer remote from the first server is in communication with the second area network and defines a third server. The third server also has memory, a third data set stored therein, and a third data interchange protocol. Transformation and exchange gateway software can be stored in the data terminal memory of the at least one data terminal of the plurality of remote data terminals, has an output in communication with the first server through the first area network by the first data interchange protocol, and has an input in communication with the second server through the second area network by the second data interchange protocol and in communication with the third server through the second area network by the third data interchange protocols to transform each of the second and third data interchange protocols to the first data interchange protocol so that the respective second and third data sets can be effectively communicated to the first server through the transformation and exchange gateway software and be in the first data interchange protocol for effective use by the plurality of remote terminals and to transform the first data interchange protocol to the respective second and third data interchange protocols so that first data set can be communicated from the first server to the second and third servers for effective use thereby.

Additionally, embodiments of a system of the present invention can include the transformation and exchange gateway software further having a plurality of inbound templates defining the input positioned in communication with the second and third servers to selectively define the respective second and third data interchange protocols prior to receiving inbound data, e.g., the second or third data sets, and at least one outbound template defining the output positioned in communication with the plurality of remote terminals to selectively define the first data interchange protocol prior to sending outbound data, e.g., the transformed second or third data sets. The transformation and exchange gateway software can further have a mapper to map connection data path instructions to the second and third servers, a data transforming and exchanging engine in communication with the mapper to locate a data path and determine a select one of the plurality of inbound templates to use for inbound data processing instructions, in communication with the select one of the plurality of inbound templates to process the inbound data set responsive to the inbound data processing instructions of the select one of the plurality of inbound templates and thereby transform the inbound data set to the outbound data set, and in communication with the at least one outbound template to send the outbound data set with the outbound data interchange protocol responsive to the outbound data processing instructions of the at least one outbound template. Also, the software can have a scheduler in communication with the mapper to schedule timing for making a connection to the second and third servers having the inbound data set and connection instructions to connect to the second and third servers having the inbound data set. The transformation and exchange gateway software can also include a set of graphical user interface (GUI) tools in communication with the data transformation and exchange engine to interface with a user. The GUI tools can include an inbound template GUI to select the inbound data processing instructions and thereby define parameters for the inbound data set and an outbound template GUI to select the outbound data processing instructions and thereby define parameters for the outbound data set.

Embodiments of the present invention also provide transformation and exchange gateway software stored in a memory. The software can include a mapper to map connection data path instructions, a plurality of inbound templates each to provide inbound data processing instructions for an inbound data set having an inbound data interchange protocol, at least one outbound template to provide outbound data processing instructions for an outbound data set having an outbound data interchange protocol different from the inbound data interchange protocol, and a data transformation and exchange engine in communication with the mapper to locate a data path and determine a select one of the plurality of inbound templates to use for inbound data processing instructions, in communication with the select one of the plurality of inbound templates to process the inbound data set responsive to the inbound data processing instructions of the select one of the plurality of inbound templates and thereby transform the inbound data set to the outbound data set, and in communication with the at least one outbound template to send the outbound data set with the outbound data interchange protocol responsive to the outbound data processing instructions of the at least one outbound template.

Further, embodiments of the transformation and exchange gateway software of the present invention can include a scheduler in communication with the mapper to schedule timing for making a connection to an entity having the inbound data set and connection instructions to connect to the entity having the inbound data set and a set of graphical user interface (GUI) tools in communication with the data transformation and exchange engine to interface with a user. The GUI tools can include an inbound template GUI to select the inbound data processing instructions and thereby define parameters for the inbound data set and an outbound template GUI to select the outbound data processing instructions and thereby define parameters for the outbound data set.

Embodiments of a system, methods, and software for data connectivity and integration of the present invention have a data transformation and exchange engine capable of interpreting templates that describe the incoming and/or outgoing data without actually carrying the data. This, for example, releases embodiments of a system, software, and methods from having to "know" anything about any other data standards or formats. Instead, these embodiments act as a sort of universal translator. This universal translator can receive data transmitted from essentially any source and transform it, according to the instructions found in the interpreting templates, into the format needed by or understood natively by a receiving destination entity or source. By providing embodiments of a system, methods, and software for data connectivity and integration of the present invention, for example, entities are no longer forced to fit their data into existing "standards." This enhances these entities abilities to do business with other entities for which they otherwise were not able.

The present invention also provides embodiments of method of data interchange. Such a method, for example, can include receiving an inbound data set having a first data interchange protocol, processing the inbound data set responsive to inbound data processing instructions to thereby transform the inbound data set into an outbound data set having a second data interchange protocol different from the first data interchange protocol, and sending the outbound data set having the second data interchange protocol.

Implementation of embodiments of TEI gateway software of the present invention advantageously can use layered architecture to allow the software to be embedded inside another application, used as an application service provider (ASP), run as a stand-alone application, or implemented as separate independent modules. The software can operate in the enterprise application integration (EAI) space because it is capable of connecting disparate systems together in a unifying manner, but is different from traditional EAI tools in that it does not require "deep" integration into customer relationship management ("CRM""), enterprise resource planning ("ERP"), or other enterprise applications in order to achieve the goal of system interoperability. For example, if the goal is to capture customer data using a CRM application, and then make sure that the customer's relevant billing information is transferred into the backend ERP system, the TEI gateway software easily handles this without requiring that the CRM and ERP systems be awkwardly united. Instead, these systems can remain separate systems without requiring that the TEI gateway software be surgically (and artificially) implanted.

BRIEF DESCRIPTION OF THE DRAWINGS

Some of the objects and advantages of the present invention having been stated, others will become apparent as the description proceeds when taken in conjunction with the accompanying drawings, in which:

FIG. 1D is a schematic view of a system for data connectivity having transformation and exchange infrastructure (TEI) for communication between a plurality of entities according to yet another embodiment of the present invention;

FIG. 21B is a schematic view of a graphical user interface having an outbound template for TEI gateway software according to an embodiment of the present invention;

FIG. 26 is a schematic view of a graphical user interface of an initial login to an account for user data connectivity management for TEI gateway software according to an embodiment of the present invention;

FIG. 27 is a schematic view of a graphical user interface of a user data connectivity management for TEI gateway software according to an embodiment of the present invention; and FIG. 28 is a schematic view of a graphical user interface of account management according to an embodiment of the present invention.

DETAILED DESCRIPTION

Figure 1A:
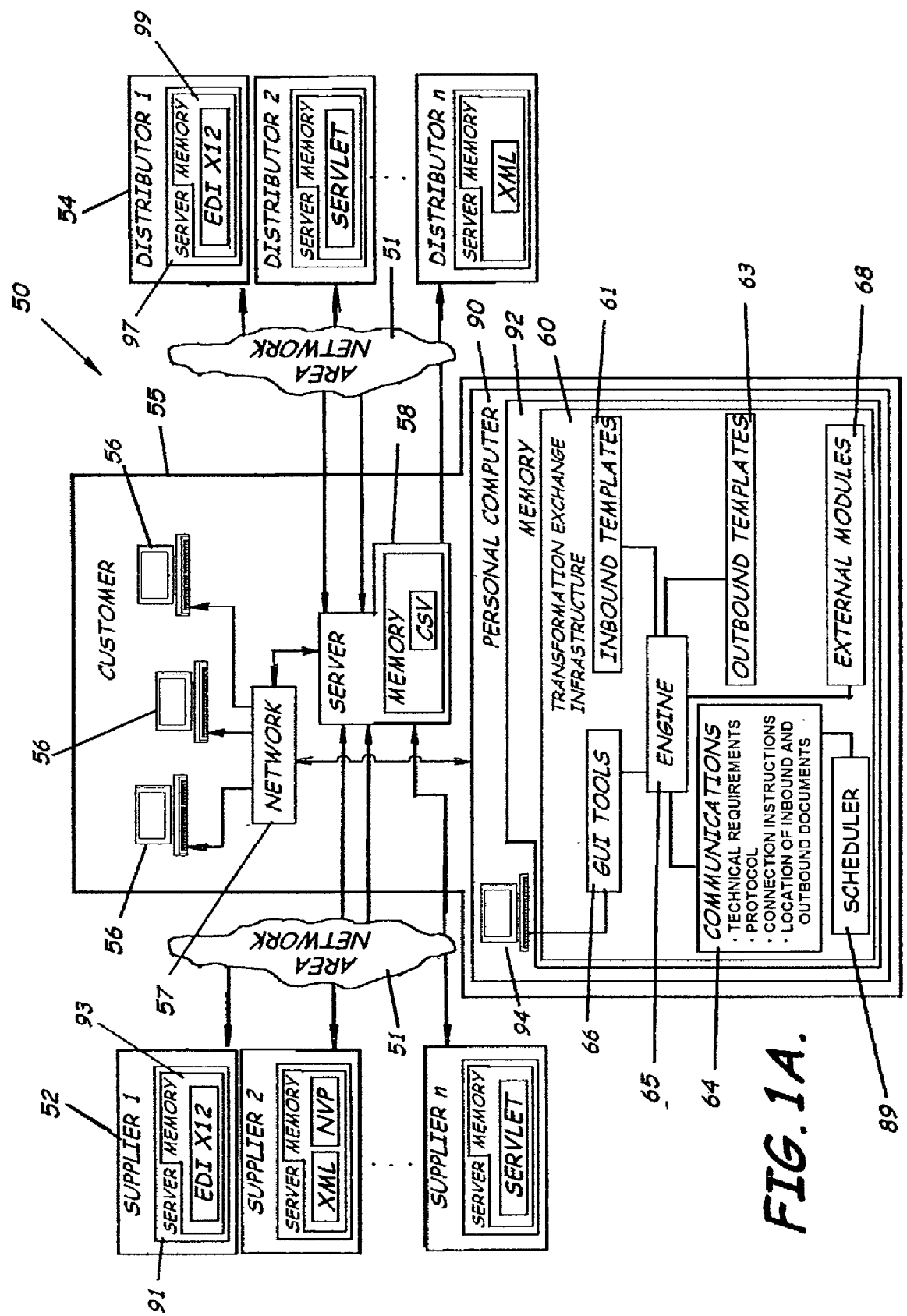
FIG. 1A is a schematic view of a system for data connectivity having transformation and exchange infrastructure (TEI) for communication between a plurality of entities according to an embodiment of the present invention.

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime, double, or triple prime notation, if used, refers to like elements in alternative embodiments.

FIGS. 1A-28 illustrate embodiments of a system 50, software 60, and methods for data connectivity having transformation and exchange infrastructure (TEI) according to the present invention and provide an e-commerce integration application that facilitates fast and economical data connectivity among multiple distinct entities using virtually any data format, connectivity protocol or delivery mechanism. IT departments within companies, for example, have the responsibility of writing, buying, deploying, and maintaining the applications and related technologies that are needed to keep a company current in the Information Age. Traditionally, there has been a give and take relationship with the "buy vs. build" decision on whether to write a customer application in-house, or to buy an off-the-shelf application written by someone else. Embodiments of TEI gateway software 60 according to the present invention, however, advantageously fit both. As shown in FIGS. 1A-1D and 6, for example, a site license in the software 60 allows companies who desire to buy an application that is ready to be deployed and used immediately to connect suppliers, vendors, partners, and others into their existing systems and lines of communications either through the company itself (see FIG. 1A) or through a third party remote service provider (FIG. 1B). An original equipment manufacturer (OEM) license in the software 60 allows companies the ability to embed the software 60 technology directly into their custom applications (see FIGS. 1C-1D), or to use whatever components of the software desired or appropriate for a "custom" solution.

These embodiments of a system 50, software 60, and methods for data connectivity and integration of the present invention can be effective in a wide variety of scenarios because of at least three design and architectural objectives: human control is kept at the semantic level and the rest is automated, the system 50 and software 60 do not require any predetermined data formats, and the architecture is layered to provide flexibility. The system 50, software 60, and methods operate in real-time and connect to internal or external data sources, regardless of the EDI or XML applications being used (this applies even if no standard is being used). The TEI gateway software 60 has an extensible J2EE or Java platform-independent solution that allows companies with distinct systems and environments to transparently exchange electronic data. It provides businesses with seamless integration and translation capabilities, regardless of any public or proprietary EDI, XML, or other data formats in use. The TEI gateway software 60 can be placed behind company firewalls for use on internal applications in addition to being used as an application service provider (ASP) or OEM. The system 50 and software 60 does not require an outside company or IT engineer to "map" the data from point A to point B but can easily be handled by a business analyst, for example. As new standards develop or evolve, the new standards can be easily integrated into the software 60, for example, in as little as a single day.

The TEI gateway software 60 supports any-to-any data exchange and is an effective, fast approach to data connectivity. It does not replace EDI with XML; rather it works directly with existing systems to create a cohesive environment where applications talk to other entities such as suppliers, customers or distributors or partners, such as shown in FIG. 1, without data loss or the requirement for extensive coding. The TEI gateway software 60 also combines XML and EDI transformation capabilities, enabling a company to extend its reach to virtually any audience. Through the use of TEI gateway software 60, e-commerce or similar applications can be integrated with a wide variety of supply chain trading partners with no fear of exclusion, high-expense, long implementation times, or other typical challenges. Once installed, frequent changes and additions to trading partners and their applications do not cause unnecessary gaps in service or lengthy software development tasks.

A number of key assumptions factor into the architecture, design, and development of the TEI gateway software 60 according to embodiments of the present invention. For example, EDI and XML are extremely well adopted, though they are not complete communication solutions as variations exist (industry leaders continue to disagree on which EDI or XML standard to adopt) including which vendor, version, style and syntax. Consequently, the first major step in developing the TEI gateway software 60 was to acknowledge that EDI and XML do not provide a "total solution" for everyone and to limit coding to any of these standards would limit what the software 60 could do tomorrow. Several data connectivity software products in the prior art have these limits and, therefore, require constant revisions and enhancements in order to keep current with shifts in industry practice. This is not in the best interest of many entities. Consequently, the data definition has been separated from the communication layers (see FIGS. 3-4) in the embodiments of software 60 and systems 50 of the present invention so that data can be transformed from any source using any method.

A first design consideration was to make the TEI gateway software 60 entirely decoupled from any existing EDI or XML "standard" by architecting it so that any such standards were held in modifiable templates, apart from the actual transformation and exchange engine, so that industry changes could be captured quickly with little coding being needed (see FIGS. 2-3 and 21-22). This has the added effect of making any proprietary changes to a given standard easy to adapt, as no coding is necessary if, for example, a company needed to extend an existing standard to better handle its own data.

Second, and a key design consideration, was that the less integration necessary to connect entities, sources, applications, or partners, the better the design. The less time, planning, and necessary resources required to efficiently integrate and connect partners, the faster the implementation and greater the return on investment (ROI) for the software users. Further, a goal was not merely to make integration easy, but to make it invisible to those being integrated. Integrating and connecting partners using software 60, methods, or a system 50 for data connectivity of the present invention can be done without the partner organization, entity, source, or application having to do any significant integration work at all. This capability was also a key design objective.

Third, the architecture and platform of the TEI gateway software 60 can be J2EE or Java compliant. This satisfies dual requirements for cross-platform capability and adherence to accepted code standards. Although the software 60 and system 50 for data connectivity was designed to require as little coding as possible, external coding may be necessary in certain situations and a goal was for it to be straightforward and accessible for information technology (IT) personnel. Additionally, the capabilities of the TEI gateway software 60 and system 50 can be extended through its pluggable modules, and it was a design goal to make this straightforward and intuitive for software developers.

Embodiments of the TEI gateway software 60 of the present invention advantageously operate in both worlds of value added networks (VAN), which traditionally use EDI to handle point-to-point data transfers, and data exchanges and marts, which have arisen to compete with the VAN paradigm and which usually only use XML or one of its derivatives, such as Web Services, rather than EDI, as the document type. One reason that TEI gateway software 60 is able to do this is because the software 60 does not care about data format, size, connection protocol, or other arbitrary forms. Because there is a difference between being 'able to handle" data in a specific format and "requiring that data be handled" in a specific format, the TEI gateway software 60 is "able to handle" any kind of data and does not "require" that it come or go in any particular form or format. The layer architecture of the TEI gateway software handles the details of receiving data from any kind of transportation protocol (such as e-mail, FTP, HTTP, a database connection, etc.) and keeps it separate from the actual format of the data (XML, SOAP, X12, EDIFACT, etc.) so that the transformation process is kept separate from the exchange process.

Embodiments of the present invention provide a system 50 for data connectivity and integration that includes a first computer defining a first server 58. The first server 58 has a first memory, a first data set stored therein and a first data interchange protocol. A first area network 57 is in communication with the first server 58, and a plurality of remote data terminals 56, 90 is in communication with the first server 58 through the first area network 57 by use of the first data interchange protocol. At least one remote data terminal 90 of the plurality of remote data terminals 56, 90 has data terminal 90 memory 92 associated therewith. A second area network 51 is in communication with the first server 58 and the at least one remote data terminal 90. A second computer 52 remote from the first server 58 is in communication with the second area network 51 and defines a second server 52. The second server 52 has a second memory, a second data set stored therein, and a second data interchange protocol e.g., XML, NVP, EDI X12 or SERVLET. A third computer 54 remote from the first server 58 is in communication with the second area network 51 and defines a third server 54. The third server 54 also has memory, a third data set stored therein and a third data interchange protocol, e.g., EDI X12, SERVLET, XML. Transformation and exchange gateway software 60 is stored in the data terminal memory 92 of the at least one remote data terminal 90 of the plurality of remote data terminals 56, 90, has an output in communication with the firs server 58 through the first area network 57 by the first data interchange protocol, and has an input in communication with the second server 52 through the second area network 51 by the second data interchange protocol and in communication with the third server 54 through the second area network 51 by the third data interchange protocol to transform each of the second and third data interchange protocols to the first data interchange protocol so that the respective second and third data sets can be effectively communicated to the first server 58 through the transformation and exchange gateway software 60 and be in the first data interchange protocol for effective use by the plurality of remote terminals 56, 90 and to transform the first data interchange protocol to the respective second and third data interchange protocols so that first data set can be communicated from the first server 58 to the second and third servers 52, 54 for effective use thereby.

Additionally, embodiments of a system 50 of the present invention can include the transformation and exchange gateway software 60 further having a plurality of inbound templates 61 defining the input positioned in communication with the second and third servers 52, 54 to selectively define the respective second and third data interchange protocols, e.g., XML, NVP, DEI X12, SERVLET, prior to receiving inbound data and at least one outbound template 63 defining the output positioned in communication with the plurality of remote terminals 56, 90 to selectively define the first data interchange protocol prior to sending outbound data. The transformation and exchange gateway software 60 can further have a mapper 64, e.g., provided by a partner map and other communication functional links and functions as understood by those skilled in the art, to map connection data path instructions to the second and third servers 52, 54, a data transforming and exchanging engine 65 in communication with the mapper 64 to locate a data path and determine a select one of the plurality of inbound templates 61 to use for inbound data processing instructions, in communication with the select one of the plurality of inbound templates 61 to process the inbound data set responsive to the inbound data processing instructions of the select one of the plurality of inbound templates 61 and thereby transform the inbound data set to the outbound data set, and in communication with the at least one outbound template 63 to send the outbound data set with the outbound data interchange protocol responsive to the outbound data processing instructions of the at least one outbound template. The software 60 can also have a scheduler 89 in communication with the mapper 64 to schedule timing for making a connection to the second and third servers 52, 54 having the inbound data set and connection instructions to connect to the second and third servers 52, 54 having the inbound data set. The transformation and exchange gateway software 60 can also include a set of graphical user interface (GUI) tools 66 in communication with the data transformation and exchange engine 65 to interface with a user (see also FIGS. 20-28). The GUI tools 66 can include an inbound template GUI to select the inbound data processing instructions and thereby define parameters for the inbound data set and an outbound template GUI to select the outbound data processing instructions and thereby define parameters for the outbound data set.

Embodiments of the present invention also provide transformation and exchange gateway software 60 stored in a memory 92. The software 60 includes a mapper 64 to map connection data path instructions, a plurality of inbound templates 61 each to provide inbound data processing instructions for an inbound data set having an inbound data interchange protocol, at least one outbound template 63 to provide outbound data processing instructions for an outbound data set having an outbound data interchange protocol different from the inbound data interchange protocol, and a data transformation and exchange engine 65 in communication with the mapper 64 to locate a data path and determine a select one of the plurality of inbound templates 61 to use for inbound data processing instructions, in communication with the select one of the plurality of inbound templates 61 to process the inbound data set responsive to the inbound data processing instructions of the select one of the plurality of inbound templates 61 and thereby transform the inbound data set to the outbound data set, and in communication with the at least one outbound template 63 to send the outbound data set with the outbound data interchange protocol responsive to the outbound data processing instructions of the at least one outbound template 63.

Further, embodiments of the transformation and exchange gateway software 60 can includes a scheduler 85 in communication with the mapper 64 to schedule timing for making a connection to an entity having the inbound data set and connection instructions to connect to the entity having the inbound data set and a set of graphical user interface (GUI) tools 66 in communication with the data transformation and exchange engine 65 to interface with a user. The GUI tools 66 can include an inbound template GUI to select the inbound data processing instructions and thereby define parameters for the inbound data set and an outbound template GUI to select the outbound data processing instructions and thereby define parameters for the outbound data set.

As shown in FIGS. 2-19, for example, the present invention also provides embodiments of method of data interchange. A method includes receiving an inbound data set having a first data interchange protocol, processing the inbound data set responsive to inbound data processing instructions to hereby transform the inbound data set into an outbound data set having a second data interchange protocol different from the first data interchange protocol, and sending the outbound data set having the second data interchange protocol.

Use of TEI Gateway Software.

The following scenario is intended to indicate how the system 50 for data connectivity and integration is used in practice such as in the example illustrated in FIG. 1.

Typical Scenario: the customer 55 creates products that are sold to a distributor 54, e.g., a Retail Partner, who then sells them to the general public. To make its products, the customer 55 also buys products from suppliers 52, e.g., Factory A, Factory B, and Factory C. Prior to the existence of electronic data interchange (EDI), all transactions between the customer 55 and its supplier factories 52 were via telephone, faxes and mail or couriers. Orders for more goods from Factory A or Factory B required someone at the customer 55 to manually place an order, then wait to receive manual confirmation through the mail (or by phone). Transactions took unnecessary time, and multiple people at both ends had to get involved to complete the process.

The customer 55, for example, can face the following problems: they want to connect to a distributor 54 using an ebXML-based data interchange protocol for its system 50, but the distributor 54 had adopted EDI X12 previously, and had not chosen to use ebXML. The customer 55 also wants to connect to the supplier 52, e.g., Factory A, Factory B, and Factory C, but there are problems here as well. Factory A was now installing a J2EE application server and custom coding it to handle orders, including a variety of planned electronic communications that they had yet to define. Factory B was already using EDI X12 via the web, and insisting that anyone doing business with them had to use (their choice of) EDI X12 to do business with them. Factory B had long ago created a proprietary system that used its own socket based system, and had no budget to adapt to a new system, including any changes to their order form.

Previously the customer 55 had to look at a number of possible solutions to solve the problems, and may have been required to invest the money to write custom data connectivity code to attach each supplier 52 to their system 50. Why? Too many off-the-shelf solutions required all of the customer's 55 partners to adopt some standard (thus almost never happens), or write custom code. The stopping point for the customer 55 can be that they are just agreeing to sign up 500 new vendors and merchants, and each would likely require significant, custom setup. The customer 55 simply does not have the programming staff (or budget) for such a project.

The data connectivity to the distributor 54 is solved, because the TEI gateway software 60 can handle any form of EDI or other data interchange protocol. The connectivity to Factory A is also resolved, because the TEI gateway software 60 can be adaptable to any kind of data stream that Factory B's J2 EE application is likely to use. Factory B is gracefully handled, because the TEI gateway software also handles any form of EDI and Factory C's proprietary socket connection is not an issue, nether is their proprietary cryptic order form, because the TEI gateway software 60 does not require any particular data format, only that someone indicates how it should be translated into the workflow. The customer 55 also can select the TEI gateway software 60 for this application because it can accommodate the 500 new vendors and merchants the customer 55 wants to bring into their trading application.

The TEI gateway software 60 is platform independent (any 32EE compliant platform), connects using FTP, HTTP/S, e mail, socket, files, custom protocols and/or interfaces for support (see FIG. 4), and has drag drop user interface for managing data, systems integration and partners. The TEI gateway software 60 has extensible capabilities via pluggable modules 68 and can be directly integrated with most Enterprise Application Servers (Weblogic, WebSphere, SunOne, Borland, Jboss, etc) as understood by those skilled in the art. The system 50 for data connectivity and integration, for example, can have 128 bit security, dynamic document and form recognition, and automatic data merge, translation, and split logic for store and forward capabilities. The TEI gateway software 60 can provide support for new HIPPA standards and have reporting mechanisms for performance and usage (see FIGS. 2-3). For example, the supported platforms can be Linux, Solaris, HP Unix, Windows NT/2000 Oracle, Sybase, DB2, and MySQL.

TEI gateway software 60 can advantageously be used to connect multiple sources and providers of electronic data together into a system 50 that acts as if no natural barriers exist between them. Most systems have little in common with each other and do not easily work together at all, let alone in a seamless and integrated fashion. The TEI gateway software 60 advantageously makes such electronic connectivity possible in a realistic, effective, straightforward, and rapid manner. The TEI gateway software 60 is focused to efficiently connect, transmit, receive and transform, electronic data between diverse trading partners, suppliers 52, distributors 54, information brokers, or other sources of electronic data.

As illustrated in FIGS. 1A, 2-6, and 20-28, the TEI gateway software 60 or infrastructure has the following seven main elements:

(1) Data Transformation and Exchange Engine 65 (the core software itself);

(2) Adapter Layer (Communications Groups) 64 (documents that describe remote partner, entity, source, or application configurations);

(3) Template Layer (Inbound and Outbound Templates) 62 (describe data transformations);

(4) GUI Tools 66 (for partner and system administration);

(5) Security Layer 77 (where digital rights management and other security measures are called);

(6) Plug-in-Layer 68 (ability to call, invoke and pass data to external systems); and (7) Process Management/Workflow Layer (where scheduling takes place).

The transformation and exchange engine 65 is the core of the application. The Communications 64 and Inbound and Outbound Template 61, 63 define rules, and the transformation and exchange engine 65 can be considered the implementation resource for those rules. When a Scheduler 89 reads the Communications Group 64 and determines when, and how, to initiate contact with the partner entity, e.g., 52, 54, the incoming data is passed, along with the appropriate Inbound and Outbound Templates 61, 63 to the transformation and exchange engine 65 for processing. The engine 65 first reads the Communications Group 64 to determine which templates 62 to use, then reads the Inbound Template 61 to configure itself to handle the incoming data appropriately. The data is processed according to the blueprint found in the Inbound Template 61, including all dynamic substitutions and transformations. If multiple Inbound Templates 61 have been specified, these are aggregated and processed accordingly. Once all the data needed by the Outbound Template 63 has been collected and transformed, it is sent to the destinations(s) specified, according to the rules contained in the Outbound Template 63.

The TEI gateway software 60 uses a core engine 65, written in Java or other software programming language as understood by those skilled in the art that manages connectivity between and among various electronic data partners. The system 50 is designed to allow either a distributed or single-server deployment model, and can accommodate the preferences of an IT department with regard to database utilization, file system use, high availability, error handling, and load balancing. It is database independent, file system independent, and fits into existing IT infrastructure for load balancing and messaging. The Scheduler 89 is responsible for general coordination of the application. When the system 50 is started up, it loads all the communications Group 64 (see FIG. 20) and scans them for directions on when and how to connect to the partner entities. This information is cached, and as each communication, e.g., a supplier 52, a distributor 54, requirement is examined, the Scheduler 89 creates a process to handle the interaction. Typically, a communication will require one of two conditions: open a Listener, and wait for any incoming data from that entity, or periodically make calls into the entity's system with data requests. The Scheduler 89 does not distinguish whether the entity wants to conduct business in real-time or using nightly batch feeds. Nor does it distinguish whether the data is incoming or outgoing, multi-source or single-source. It simply takes and manages the information stored in the Communications Group 64, which is where al the instructions exist.

The Communications Groups having adapters 64 are the documents that describe the technical requirements of each company, organization, entity, source, or application that is being connected to, including the protocol(s), connection details, and where to locate the Inbound and Outbound documents for each company. The Communications Group 64 contains all the essential data necessary to physically connect to, and communicate with, the outside entity. The Communication Group mapping itself simply acts as a single point of contact for the system 50, and is basically the "roadmap" on how to interact with that particular company or organization as understood by those skilled in the art. Only one Communications Group 64 is required for each company 52, 54 agency, or organization being configured. The Communications Group 64 also holds information on where to find the related Inbound and Outbound Templates 61, 63 needed to handle data interactions with the external entity. Although each entity 52, 54 only requires exactly one unique Communications Group 64, that is not necessarily the case for Inbound or Outbound Templates 61, 63, which can be reused by multiple entities (i.e., two different entities can reference the same Inbound Template 61).

The Communications Group 64 acts as the first point of contact for the TEI to identify the communication protocol(s), transport layer(s), Inbound and Outbound Template location(s), and all other data required to do business electronically with that particular entity 52, 54. Further, the Communications Group 64 contain document recognition intelligence necessary for the system 50 to dynamically evaluate incoming data streams and select the correct Inbound Template(s) 61 to use. This capability is one of the key strengths of the software 60; by allowing the process of field mapping and transformation to be done in a data-driven manner, the run-time flexibility of the system 50 is significantly enhanced. Further, the flexibility achieved in allowing incoming data to dynamically select the Outbound Templates 63, as well as trigger appropriate transformations, has the beneficial side effect of eliminating or greatly reducing the need for any external coding.

There are three kinds of templates used for each communication from a supplier 52: a single Communications Group 64 (see above), one or more Inbound Templates 61, and one or more Outbound Templates 63. All three of these templates, for example, can be XML-based, or other data interchange types as desired, but since they are only used internally by the TEI gateway software 60, outside systems do not necessarily have to be XML aware or compliant. The Inbound and Outbound Templates 61, 63 are where the descriptions of the data (such as EDI or XML) mappings are held. These files are dynamically applied based upon business rules defined in the Communications Group 64. Each template 61, 63 contains the descriptive information needed by the core system to correctly collect, process, and route the data as understood by those skilled in the art. These documents can be XML-based, but do not require XML to be used as part of the incoming or outgoing data stream. The GUI tools 66 are responsible for the creation and management of the Partner Communications 64, Inbound Template 61, and Outbound Template 63 (see Templates 62 of FIG. 4). Although it is not necessary to use the GUI tool 66 to crate these documents, the GUI tools 66 have been designed to make the creation and editing of these documents straightforward and efficient, (see e.g. FIGS. 20-28).

Figure 21:
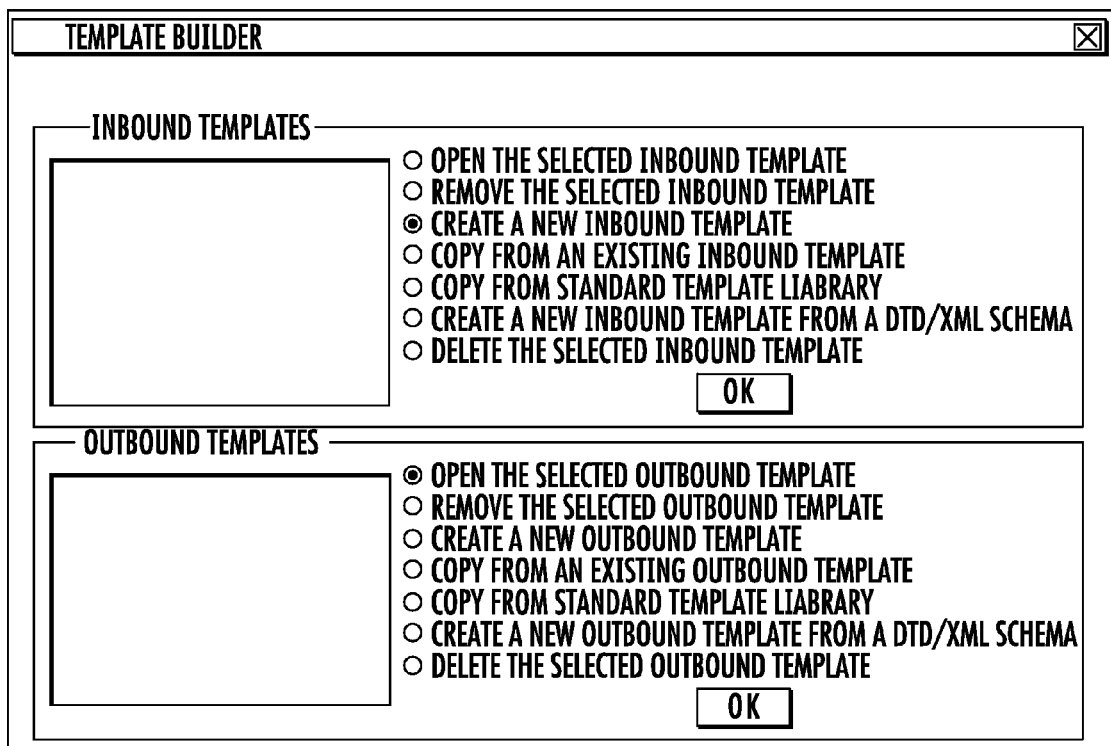
FIG. 21 is a schematic view of a graphical user interface to select and create inbound and outbound templates for TEI gateway software according to an embodiment of the present invention.
Figure 21A:
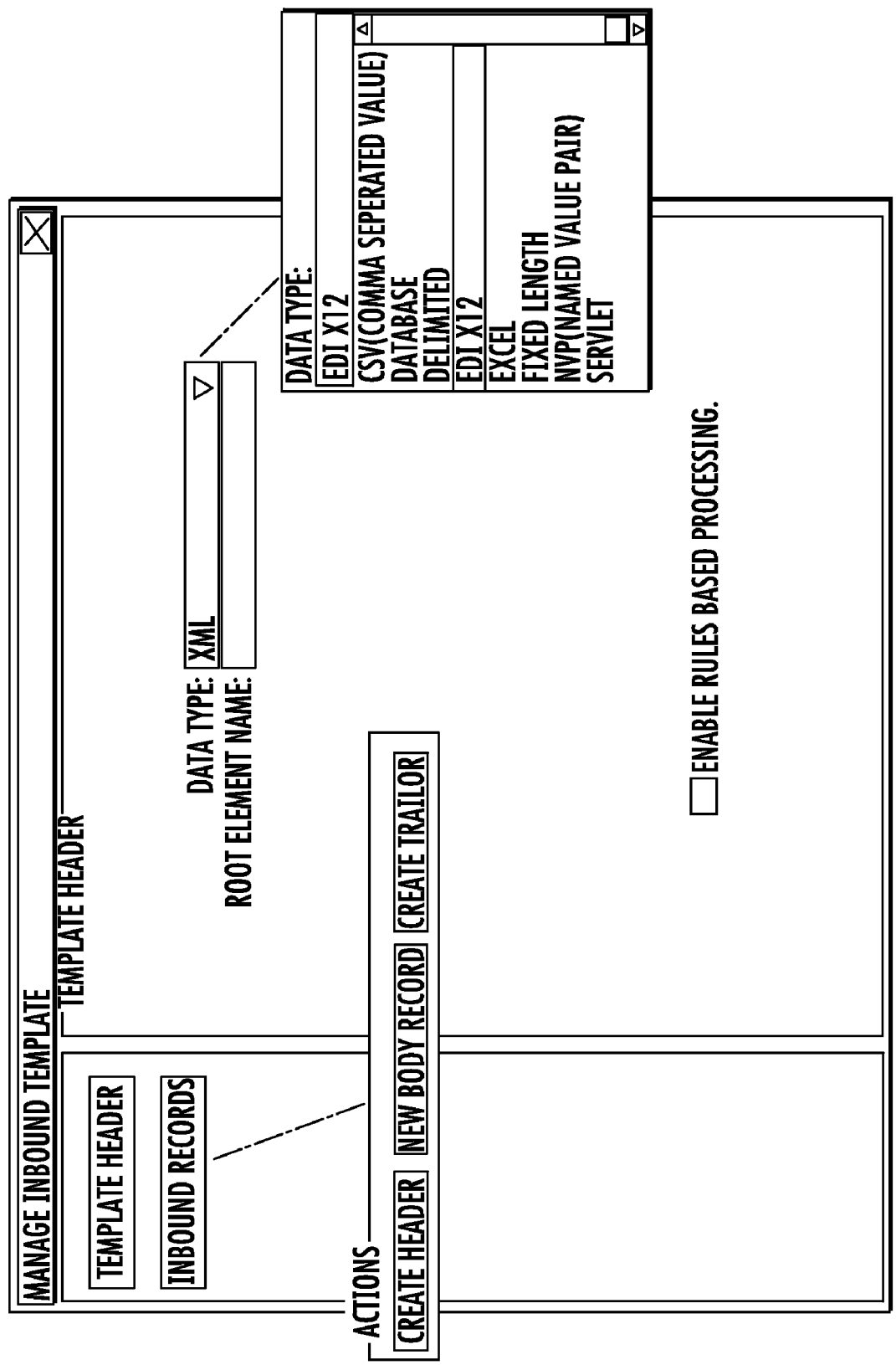
FIG. 21A is a schematic view of a graphical user interface having an inbound template for TEI gateway software according to an embodiment of the present invention.
Figure 22:
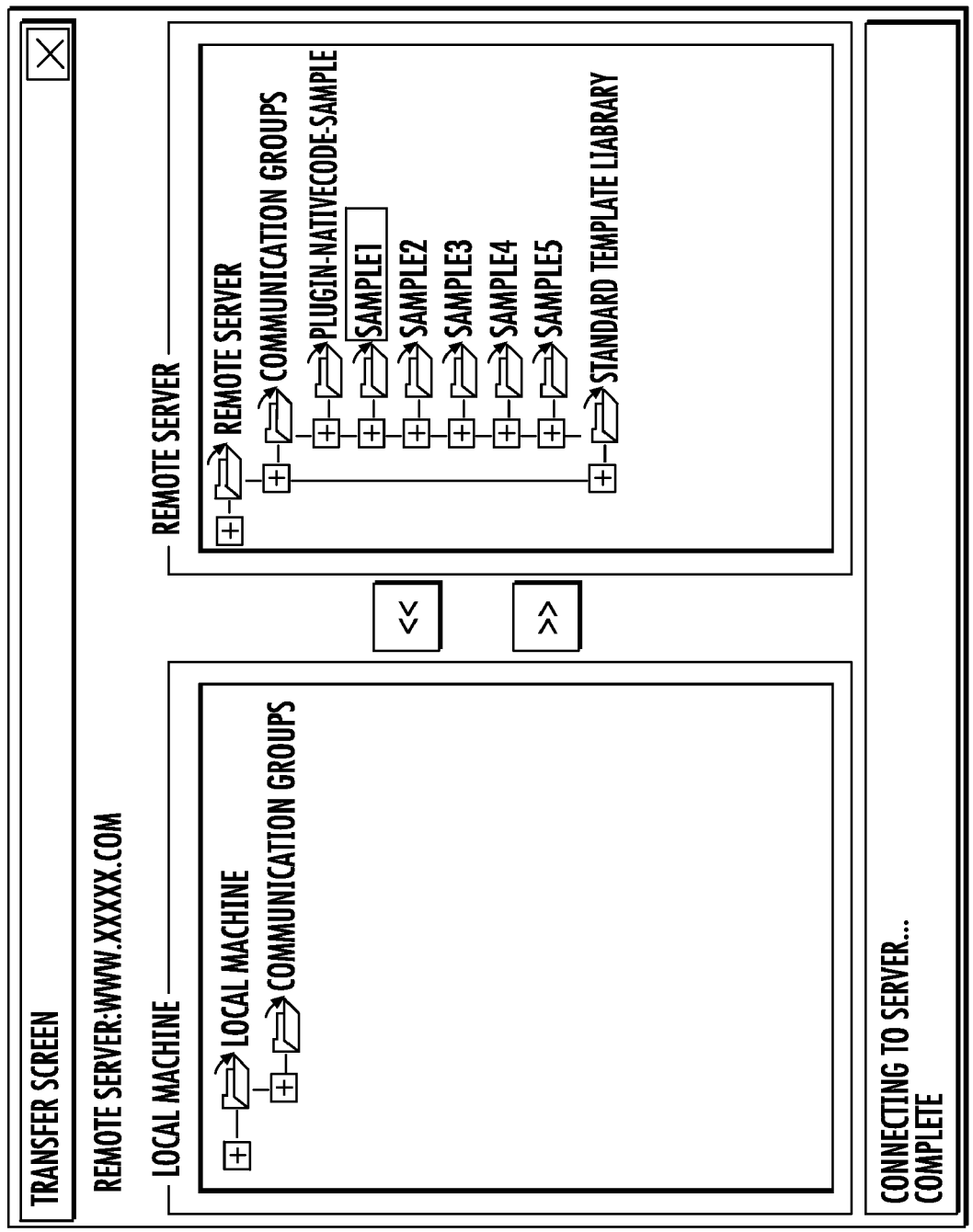
FIG. 22 is a schematic view of a graphical user interface having a transfer screen to connect from a local machine to a remote server for TEI gateway software according to an embodiment of the present invention.
Figure 23:
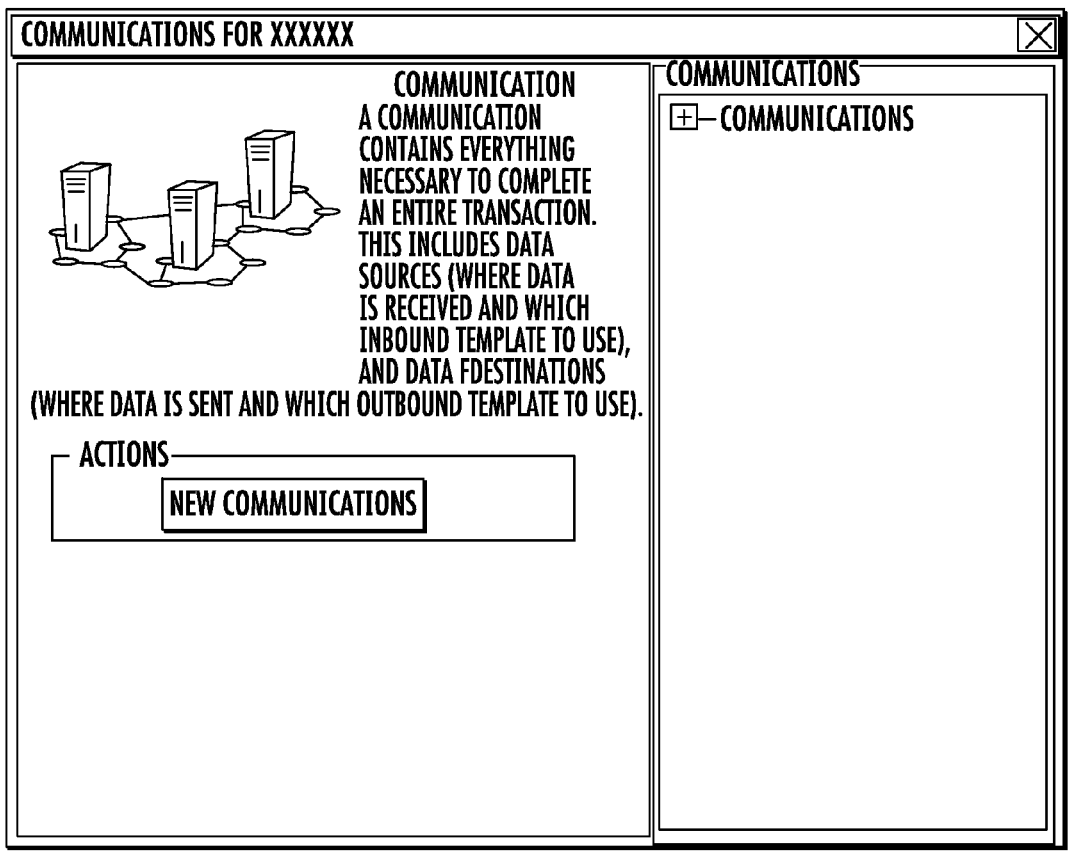
FIG. 23 is a schematic view of a graphical user interface to establish communications to complete a data exchange or transaction for TEI gateway software according to an embodiment of the present invention.
Figure 24:
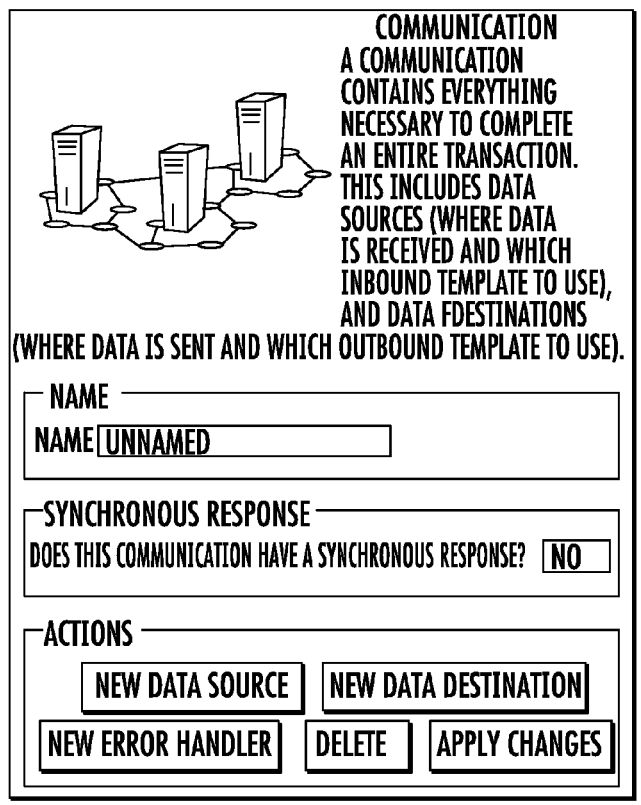
FIG. 24 is a schematic view of a graphical user interface to select communications for TEI gateway software according to an embodiment of the present invention.
Figure 25:
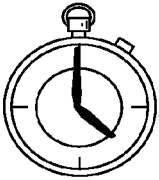
FIG. 25 is a schematic view of a graphical user interface of a schedule manager for TEI gateway software according to an embodiment of the present invention.

The Inbound Template 61 is where the actual instructions on how to handle and interpret the incoming data are stored (see FIG. 21A). When the Communications Group 64 has identified (to the TEI engine 65) which Inbound Template 61 to use, both that template 61 and the incoming data are passed to the TEI engine 65 to be parsed and transformed according to the rules contained in the template 61. The Inbound Template 61 describes the incoming data to the TEI engine 65, which processes the data according to rules present in the template document; including all substitutions, field rearranging, alpha and numeric transformations, and any other data massaging that may be required; including any calls to any pluggable external module 68 which can do additional data manipulation as necessary. Although the Inbound Template 61 is written in XML, the template is most often created using the GUI tools 66 provided with TEI gateway software 60 (see FIG. 21A). Since the template has the responsibility of describing potentially complex and/or recursive data sources in terms that the TEI engine 65 can understand, the GUI tools 66 provide a straightforward way to create, edit, and manage these documents. It is certainly possible, however, for the programmers or experienced IT personnel to utilize third party tools to write these XML documents, however, if desired, according to the present invention. The GUI tools 66 are provided for convenience and to reduce potential errors.

The Outbound Template 63 is essentially the exact reverse of the Inbound Template 61, with a few additions (see FIG. 21B). Since the needs to the system 50 ultimately receiving the data are paramount, the Outbound Template 63 drives additional dynamic performance, such as requiring multiple data feeds from more than one Inbound Template 61 and allowing multiple outbound types of connections.

The Plug-in Module 68 exists or can be used to facilitate advanced data transformation capabilities in cases where the robust capabilities of the system 50 are insufficient to handle the complexities. The "Pluggable" Module 68, for example, allows any external system or code to be invoked so that processing can be passed outside of the software 65 for further handling. This may be necessary in cases where proprietary or classified data needs to be handled, or in cases where complicated calculations (such as invoking tax tables or real-time currency trading) must be handled.

The Security Layer 72 is where internal security protocols, such as PGP, SSL, or other security measures are invoked. Depending on the exact nature of the security requirements, these could even be calls into a third party system, such as Digital Rights Management system as understood by those skilled in the art.

The Process Management/Workflow Layer is where the Scheduler 89 (including a transaction scheduler 67 or controller) runs the various schedules where processes are started to perform various tasks (see FIGS. 25-28). It is also where real-time listening takes place for external events that trigger some internal response.

The logical architecture of the TEI gateway software 60 does not require the same limits on acceptable data types of communication protocols that are most often found in middleware products. It does not require that a pre-defined template exist for a new trading partner or entity. This is because the TEI engine 65 makes no assumptions about the nature of data that is to be transmitted or received. Data is generally received into the TEI gateway software 60 via a file transfer protocol (FTP), email, hypertext transfer protocol (HTTP/S), Socket, or a database management system (DBMS) connection using a variety of connection protocols, such as transmission and control protocol (TCP)/internet protocol (IP), Inter-network packet exchange (IPX), post office protocol (POP), internet message access protocol (IMAP), or others routes, schemes, connections, database configurations, or protocols 71 of various partner communications 70, including application integration 75 and relational databases 73 (see FIGS. 2-4). The software 60 can accommodate any known protocol or connection mechanism, as these are merely adaptors and act as an abstraction layer to the physical data stream. An adaptor 63 as understood by those skilled in the art can be created for any connection required.

Figure 2:
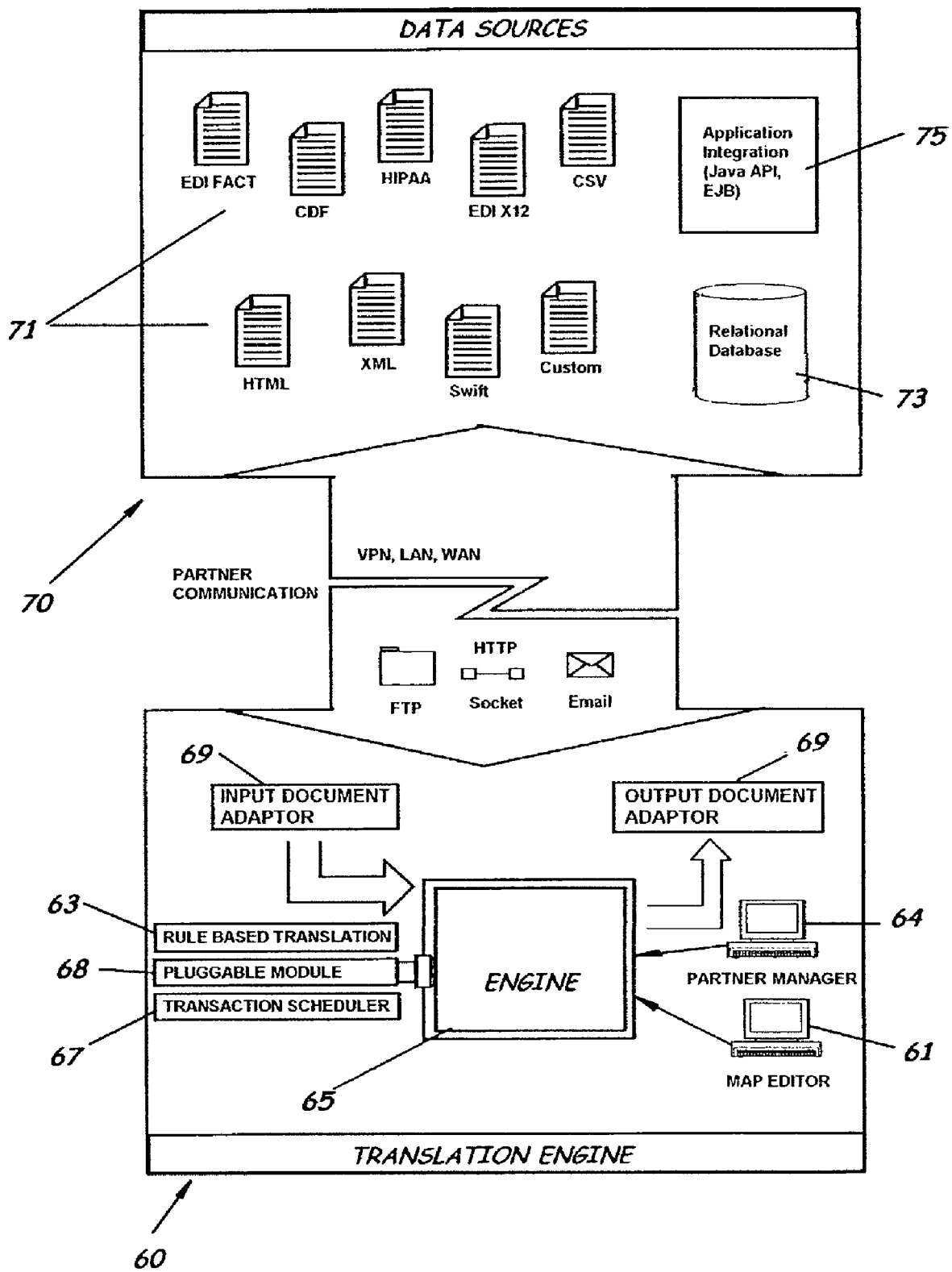
FIG. 2 is a schematic view of a system for data connectivity having TEI for communication between a plurality of entities having TEI translating gateway software according to an embodiment of the present invention.
Figure 3:
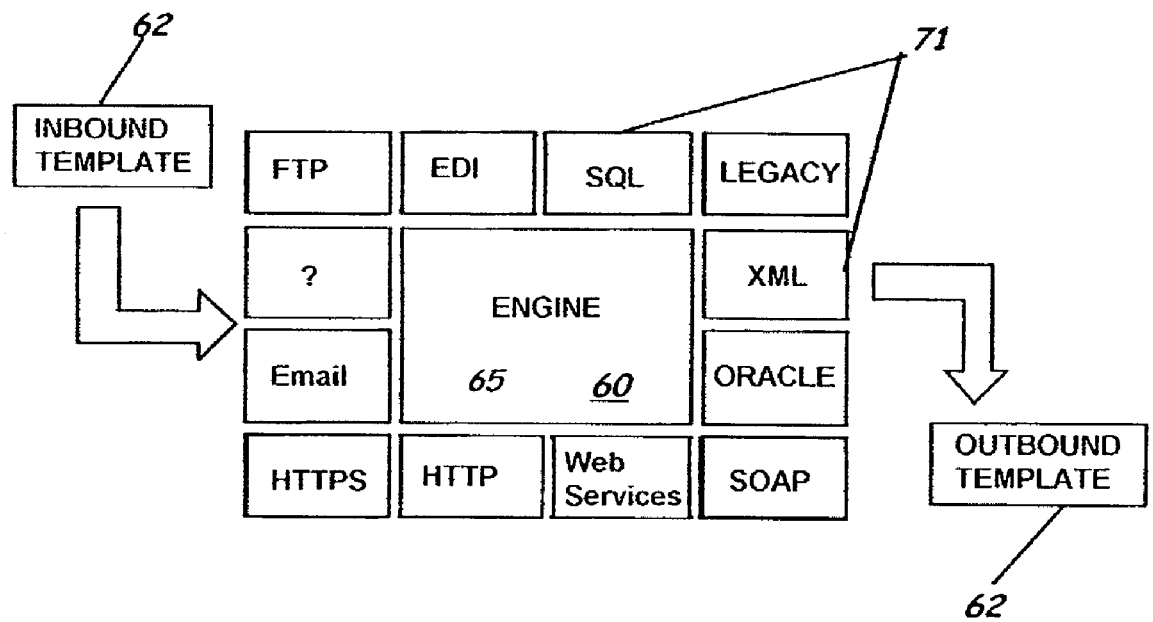
FIG. 3 is a schematic view of TEI gateway software according to an embodiment of the present invention.
Figure 4:
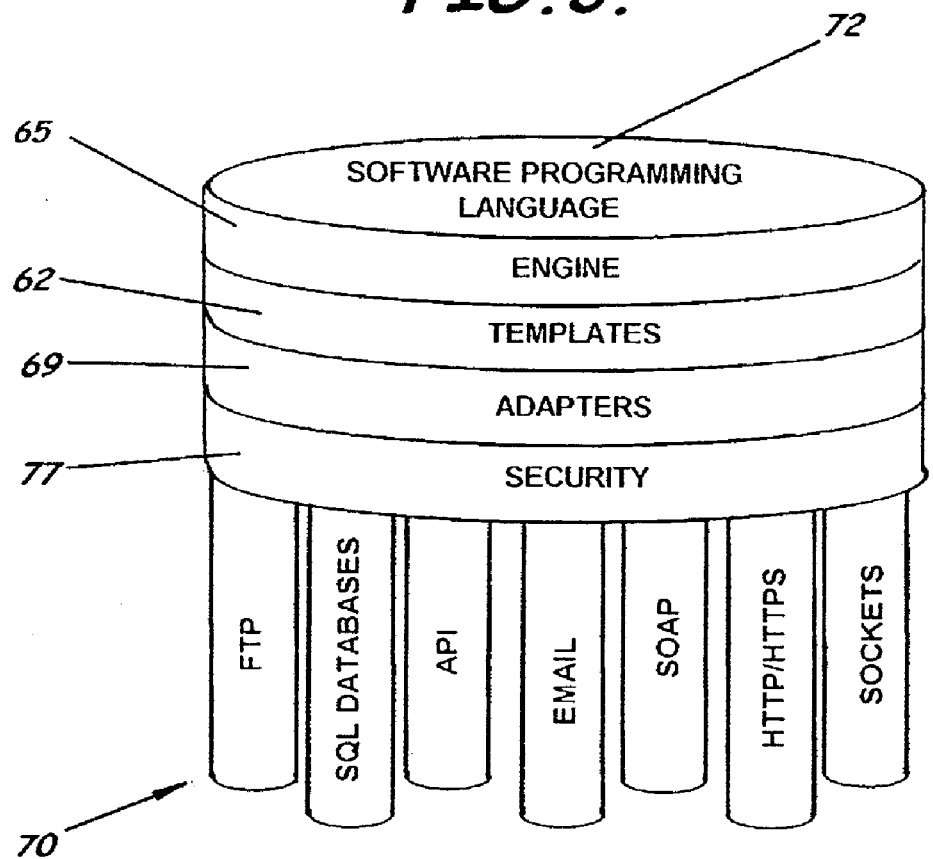
FIG. 4 is a schematic view of TEI translating gateway software having independent and separate data interchange connectivity and layering for the TEI according to an embodiment of the present invention.
Figure 5:
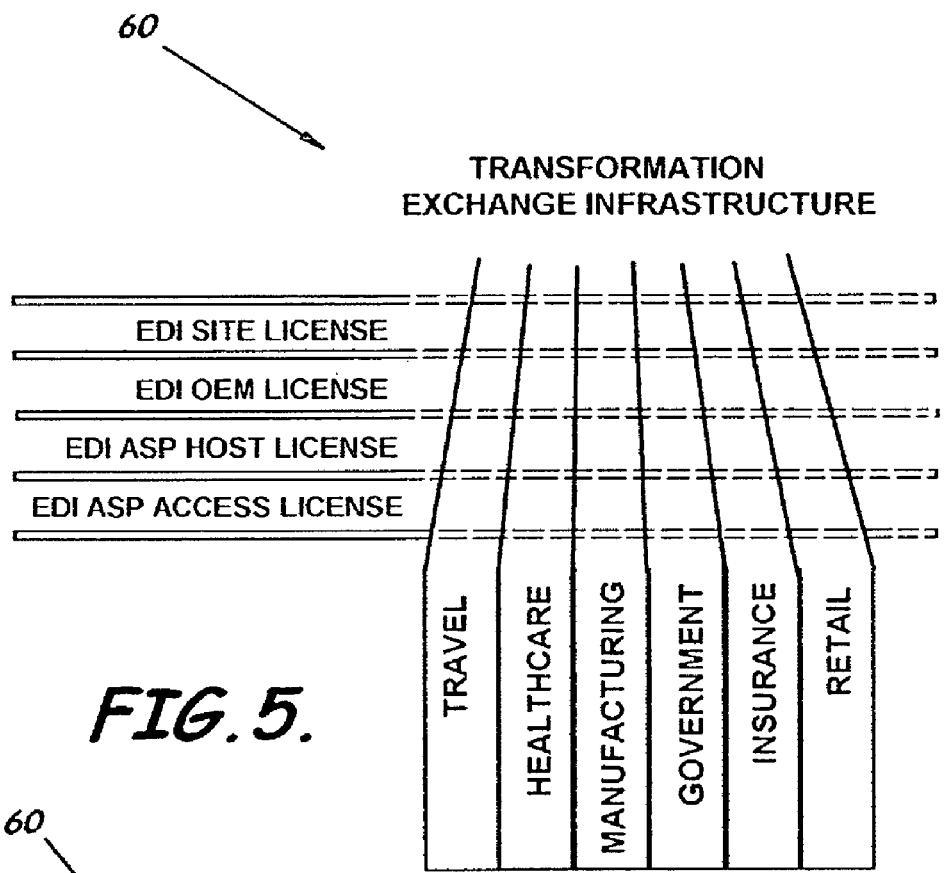
FIG. 5 is a schematic view of a method of doing business for data connectivity according to an embodiment of the present invention.
Figure 6:
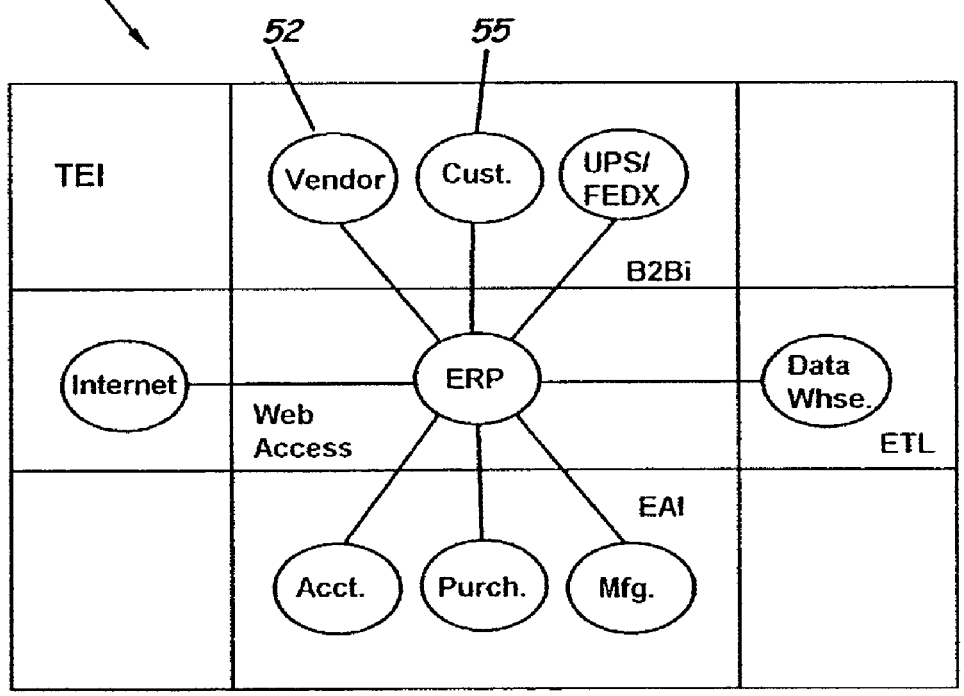
FIG. 6 is a schematic environmental view of a system having TEI for communicating between a plurality of entities according to an embodiment of the present invention.

Communication information (the Communications Group 64, Inbound Template 61 and Outbound Template 63), which is collectively shown in FIG. 2 as Input Document Adaptor 69 and Output Document Adaptor 69, is defined using a graphical user interface (see FIGS. 20-28). These adaptors 69 define the connectivity required to do business with a particular entity, and the adaptors 69 can be written in extensile markup language (XML) or in other protocols. Because they can describe any kind of incoming or outgoing data, the adaptors 69 are used by the TEI engine 65 to translate how to interact with the Partner 52, 54 on a particular transaction (Partners 52, 54 can have as many kinds of transactions as they require). The communications, as shown in FIGS. 7, 20 and 22-24, can be used to coordinate and plan the communication transactions or workflow process.

Data entering the TEI engine 65 is filtered using the appropriate Inbound Data Template 61, which describes in detail how the engine 65 is to parse and transform that particular data stream (see FIGS. 7-19). In addition, data requiring additional processing or evaluation that goes beyond the transformation capabilities already built into the system 50, can utilize both a rule-based transformation service (the Rule-Based Translator), as well as calling an external Pluggable Module 68, as understood by those skilled in the art, that allows incoming or outgoing data to be manipulated as needed by outside systems or external classes, functions or RPC. The Plug-in Module 68 allows the capabilities of the system 50 to be extended as needed, using any language or system required to do so. The point of entry is through a Java wrapper class that can be configured to setup and call the external system, passing any data to and from the system 50 as needed. The Plug-in Module 68 extends the application capabilities to integrate with legacy applications, customized code, or any other external hooks that need to be called or utilized during the handing of inbound and outbound data. The module 68 allows direct connections to application such as SAP, Oracle, i2, J. D. Edwards, PeopleSoft, iPlanet, BEA, and others. It also allows programmers to extend the system capabilities by calling any external code, which can be written in any language.

The TEI gateway software 60 has native transformation capabilities that are extensive. Therefore, it is unlikely that the Pluggable Module 68 will be needed for ordinary transformation and routing needs. It is more likely called when outside systems need to be invoked, such as calls to a tax processing system, getting government immigration data, or checking current stock and bond pricing. The TEI gateway software 60, for example, can run on any hardware capable of running an Enterprise Java system (which is nearly every piece of computing hardware in existence). The exact configurations, memory, disc storage, and other such factors are entirely dependent upon the anticipated load, transaction volume, and size of the data being handled. For example, a single Windows-based server can handle approximately 1500 transactions per minute, assuming each transaction is approximately one kilobyte in size. The TEI gateway software 60 can be deployed on a single machine, or across an entire cluster, depending upon the load balancing and high-availability needs of an organization. Further, the TEI gateway software 60 can run on any system 50 capable of running Java or the selected programming language, so hardware decisions can be used based upon company preference and capacity requirements.

Figure 1B:
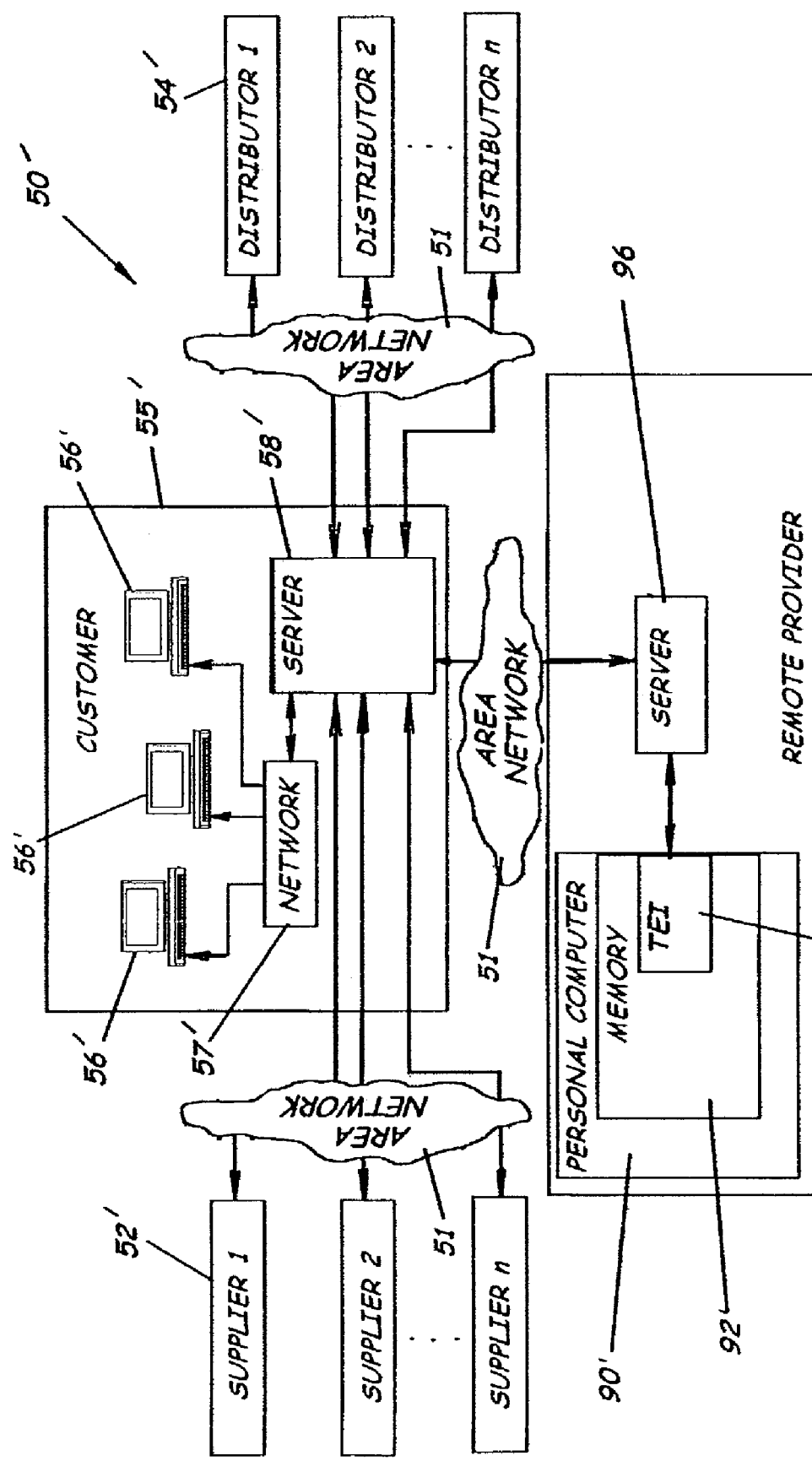
FIG. 1B is a schematic view of a system for data connectivity having transformation and exchange infrastructure (TEI) for communication between a plurality of entities according to another embodiment of the present invention.
Figure 1C:
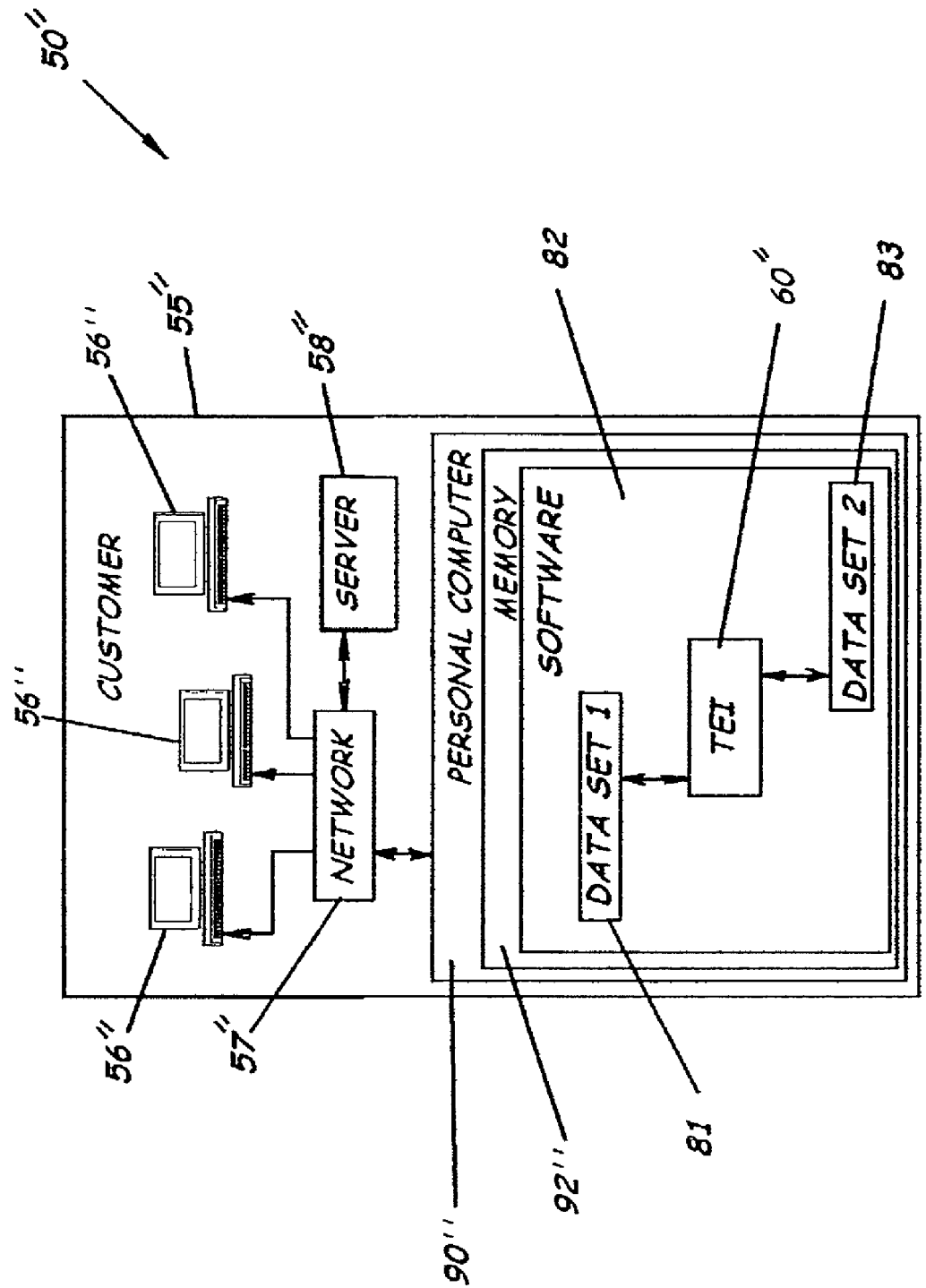
FIG. 1C is a schematic view of a system for data connectivity having transformation and exchange infrastructure (TEI) for communication between a plurality of entities according to still another embodiment of the present invention.

In the example in FIG. 1A, the customer's 55 setup can take the following configuration:

(a) A Sun Microsystems server 58 running the Solaris operating system, for example, can be the primary machine, where all transaction logs can reside.

(b) A Windows 2000 personal computer (PC) 90, for example, can be used to provide load balancing and redundancy and can be dedicated to the TEI gateway software 60.

(c) A single Macintosh running OSX, as another remote data terminal 56, for example, can also be setup to provide additional load balancing and fault-tolerance, even though it can sometimes be used for other purposes at the same time.

The machines can be configured as follows:

(a) The Sun Server 58 can run the System Service, which has the responsibility of knowing about and keeping connection with the other machines in the cluster and managing system-level services. It also can run a transaction managing controller of the scheduler 89 software, as understood by those skilled in the art, which manages the actual transactions going between the customer 55 and its partners 52, 54;

(b) The Windows 2000 PC 90 can run another instance of the transaction managing controller of the scheduler 89; and (c) The Mac OSX PC 56 can also run an instance of the transaction managing controller of the scheduler 89; and (d) The customer's 55 existing web server can run the Scheduler Servlet, which has the responsibility of coordinating transactions by notifying any one of the transaction managing controller of the scheduler 89 that a partner's external system 52, 54 requires interaction.

The list of partners 52, 54, their connectivity requirements, inbound processing requirements, and outbound definitions also can be stored as documents on the primary Sun Microsystems server 58, although it is just as possible to store them in a customer's Oracle database and/or replicate them across all machines as understood by those skilled in the art. It is solely a matter of preference by the IT staff to store them in one location on the Sun Microsystems server 58. The Scheduler 89 can then get the updated list of partner requirements from the Sun server 58 as needed, so that it can perform its role of notifying the transaction managing controller of the scheduler 89 that transactions need to be processed. In addition to the above configuration, a number of individuals in IT, as well as one or more business analysts who had been properly trained can have their desktop PC's loaded with the customer software (Java-based) that streamlines the configuration of the Communications 52, 54. The TEI gateway software 60 has a robust graphical user interface to allow IT professionals and business analysts the ability to quickly construct Communications Groups 64 and Inbound and Outbound Templates 61, 63. The GUI tool 66 also supports general administrative functions for setup and deployment of the TEI gateway software 60.

Connecting a partner 52, 54 is accomplished by defining connection parameters necessary to interact with an outside entity, regardless of the entity. In addition, setting up and configuring a partner 52, 54 involves answering a number of basic questions about how data is to be sent or received, its format, transformations, substitutions, and related technical information. Looking again at the connections between the customer 55 and its partners 52, 54, the information needed to set up electronic interaction between each of them, as understood by those skilled in the art, involves a number of simple questions:

(a) How is the customer 55 physically going to communicate to each partner 52, 54?

(b) How many kinds of transactions will take place between the customer 55 and each partner 52, 54? [such as payment transactions, invoicing, price quotes, etc.]

(c) For each kind of transaction, how many variations of inbound or outbound data exist? [inbound and outbound data refers to each discreet chunk of data that is either coming into, or going out of, the company]

(d) In the case of customer's 55 desire to connect to a supplier 52, the logical partner setup would appear as follows:

(e) The customer 55 can physically communicate with supplier 52 over a TCP/IP connection via a standard Internet connection. Once the physical connection is made to supplier's IP address, the supplier 52 requires that the customer 55 connect and authenticate to a port, e.g., 2741, which is the supplier's official "outside vendor authentication port."

(f) The customer 55, for example, can be sending two outbound kinds of electronic data: current price quotes on existing inventory, and invoices for purchased goods (or others as desired).

(g) The customer 55, for example, can receive one kind of inbound data: purchase orders.

Once this is accomplished, partner setup is a simple process comprised on N steps. A single partner document is created for the supplier 52. This document serves as the starting point for all system-contact with the supplier 52 and contains all the required information needed to communicate with them, regardless of advanced levels of complexity in the installation. The physical setup of the supplier document can be handled by the customer 55, and may be edited and configured by any external editor at the discretion of IT staff or personnel. Additionally, the Communications Group 64 can be edited locally on a PC 90 or remotely on the server 58, according to the specifications of the IT department. The Communications Group 64 are given a unique name, such as "Supplier 1" and the location of where to locate and store partner-related temporary files is specified as a document path. Then each of the unique Inbound and Outbound files (one file for each unique connection) is specified, such as location, connection information, and other dynamic conditions. The location of each file can be completely different, the connection protocols and mechanisms different, and the dynamic nature of which Inbound or Outbound templates 61, 63 are actually called is entirely configurable (see FIGS. 21, 21A, and 21B).

In the case of a customer's Inbound connection, the supplier 52, for example, can complicate the issue by actually having three separate purchasing divisions that generate their own purchase orders; consequently, the customer 55 has to be able to identify and handle all three flavors seamlessly. This document recognition ability is accomplished in the conditional section, which can use a wide variety of expressions, including POSIX Regular Expressions, to dynamically evaluate incoming data and direct it to the appropriate template for processing.

To do this, the customer 55 only has to specify the names and locations of the three Inbound Templates 61, along with the incoming data to scan so that the correct template can be invoked. For example:

(a) Supplier's Automotive Division can use a comma separated purchase order which has 23 fields with a separate header section denoting date, time, issuer, and reply code;

(b) Supplier's Corporate Purchasing Department uses a fixed-length field document with 47 fields and no header section at all; and (c) Supplier's Home Division can use a pipe-delimited, variable-length purchase order with between 17 and 22 fields, and a timestamp header.

For the customer 55 to accommodate this in the Communications setup, all that is needed is to specify which incoming data will be evaluated to determine the correct Inbound Template 61 to use. Since the dynamic section of the Communications Group 64 allows different Inbound Templates 61 to be specified based on the dynamic data that was actually received, the customer 55 can specify that Inbound Template #1 be used for the Supplier's Automotive Division, Inbound Template #2 for the Supplier's Corporate Purchasing Department, and Inbound Template #3 for the Supplier's Home Division.

The actual data, that can be checked and evaluated in order to determine which template should be called, can be complex (if the data requires it), but in the supplier's case, all that the customer 55 needs to do is to specify that any pipe-delimited documents use inbound Template #3, and comma-separated documents use Inbound template #1, and everything else use Template #2, which would be a corporate purchase order, for example. The customer 55 is free to make both the checking and error-handing routines more complex if they choose to do so, but it is not required. It should be noted that all of the particulars of how to handle the inbound data itself is contained in the Inbound Template 61, and the Communications Group 64 do not need to know anything about it. Communications Group 64 simply passes control of the incoming data to the correct Inbound Template 61.

Once the customer 55 has identified which Inbound Templates 61 to use for which kind of incoming data, it then can do the same thing for the outgoing data to the supplier 52. The customer 55 only needs to create references to which Outbound Templates 63 to use for the price quotes and invoices. The fact that price quotes need to be sent via FTP and that invoices are emailed to a special accounting email address does not complicate the setup, because the TEI gateway software 60 handles these issues gracefully. The connections to the suppliers 52, e.g., Factory B, Factory A, and Factory C can be handled in the same manner, using the same approach. It makes little difference that each of these have completely different formats and modes of connectivity, because the system 50 is capable of handling each in a straightforward manner.

Transacting business using the TEI gateway software 60 is a straightforward process. Once a Communication 52, 54 has been set up, the system 50 will handle the daily, hourly, and real-time transactions without interruption. In the event that an exception occurs, such as a connection site being inaccessible or an email address being unknown, the system 50 is capable of taking a number of steps to insure that the transaction completes. If desired, IT staff can be notified that a transaction could not take place so that an operator can intervene. The TEI gateway software 60 also allows for automated and unattended use, that is its intended use is to follow the set of prescribed guidelines set down by IT staff and do it until notified otherwise. In the customer's case, once the setup is completed, no other action is required. Triggers to notify humans in boundary cases (or in the event of errors) can be setup, and the system 50 can now be left to run on its own and simply report on the transactions taking place.

As shown in FIGS. 7-19, for example, the TEI gateway software 60 can be formed by a plurality of software or programming code modules, as understood by those skilled in the art, and stored in various types of memory. As illustrated in the flow diagrams, a customer 55 can get communication information and objects (block 110), e.g., partner maps or other functions, and then create a session and start a transaction 120 (see FIG. 7). A software module can then be called to get data (block 130), which accesses a get data (block 200) routine or module as shown in FIG. 8. The get data (block 200) determines whether the inbound communication is synchronous (block 201). If so, then an adapter 69 is obtained from the synchronous adapter map set by a send data process (block 203), as described further herein, and data is obtained from the source specified in the adapter 69 (block 204). If the communication is not synchronous, then an adapter 69 based on the inbound specifications or instructions is obtained (block 202).

A determination is then made on whether the data has been received (block 205). If not, then the data session being set is made "false" for the status (block 207) and continues to wait. If yes, then whether the data needs to be decrypted (block 206) is determined. If yes, then a decrypter decrypts the inbound data (block 209). If no, or after the data is decrypted, then the data is written to the specified inbound location for transfer (block 208).

A determination is made as to whether the inbound location is a forward only destination (block 210). If yes, then the outbound templates 63 and adapters 69 are created (block 211). If no, or after the creation of the outbound templates 63 and adapters 69, the data is forwarded for call translate (block 140) (see FIG. 7).

Figure 9:
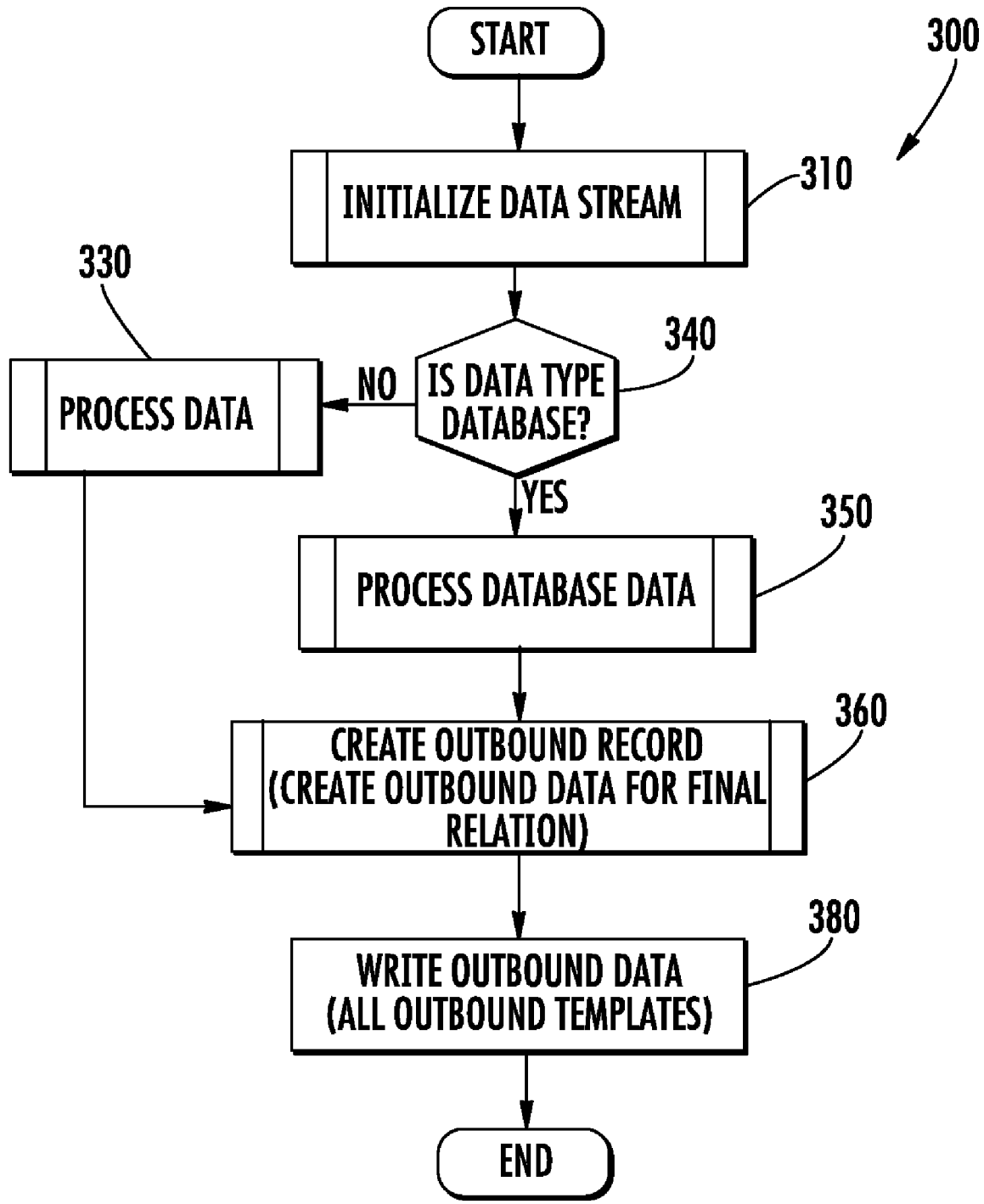
FIG. 9 is a flow diagram of a method of translating data for TEI gateway software according to an embodiment of the present invention.
Figure 10:
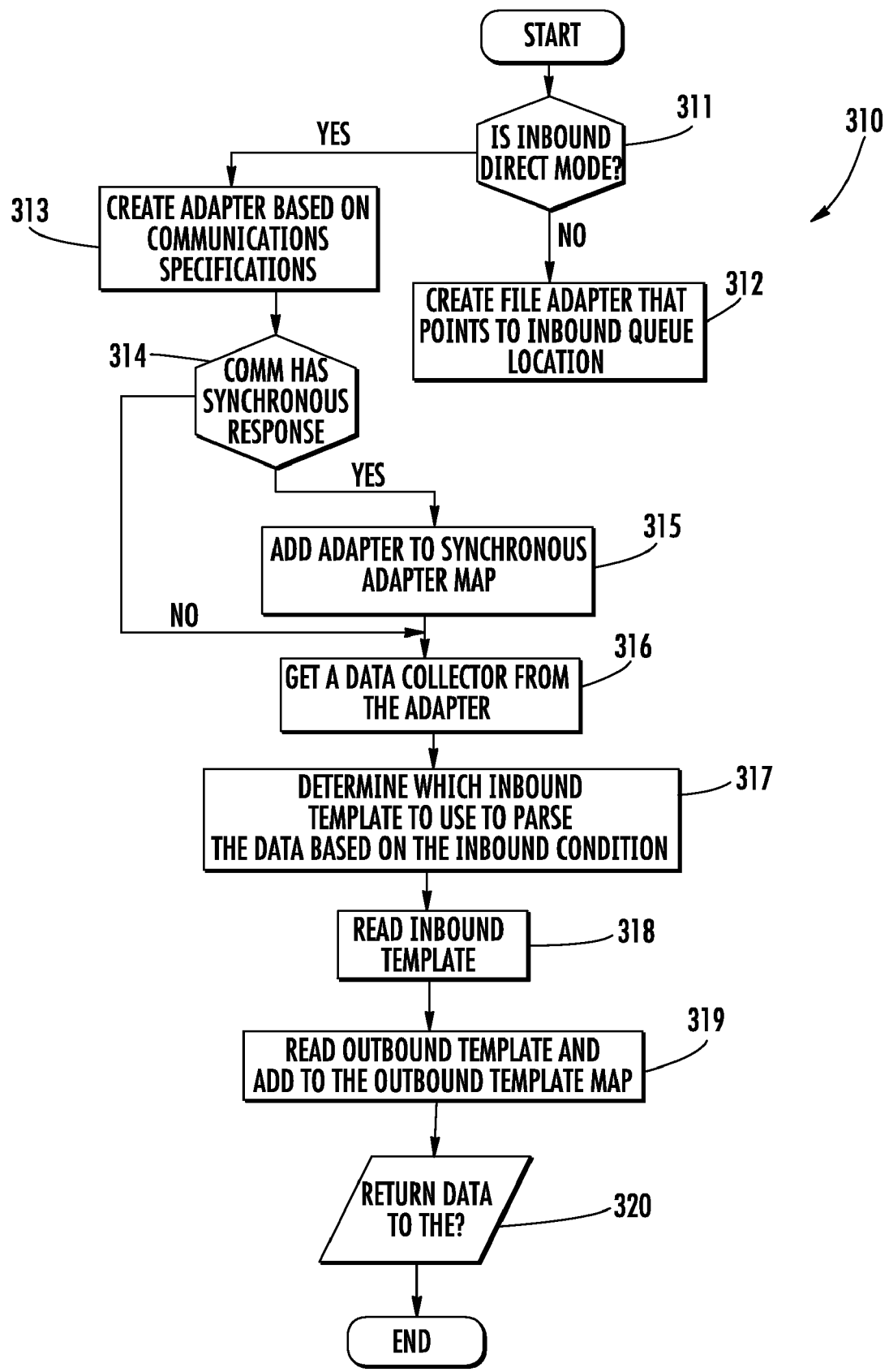
FIG. 10 is a flow diagram of a method of initializing an data stream for TEI gateway software according to an embodiment of the present invention.
Figure 11:
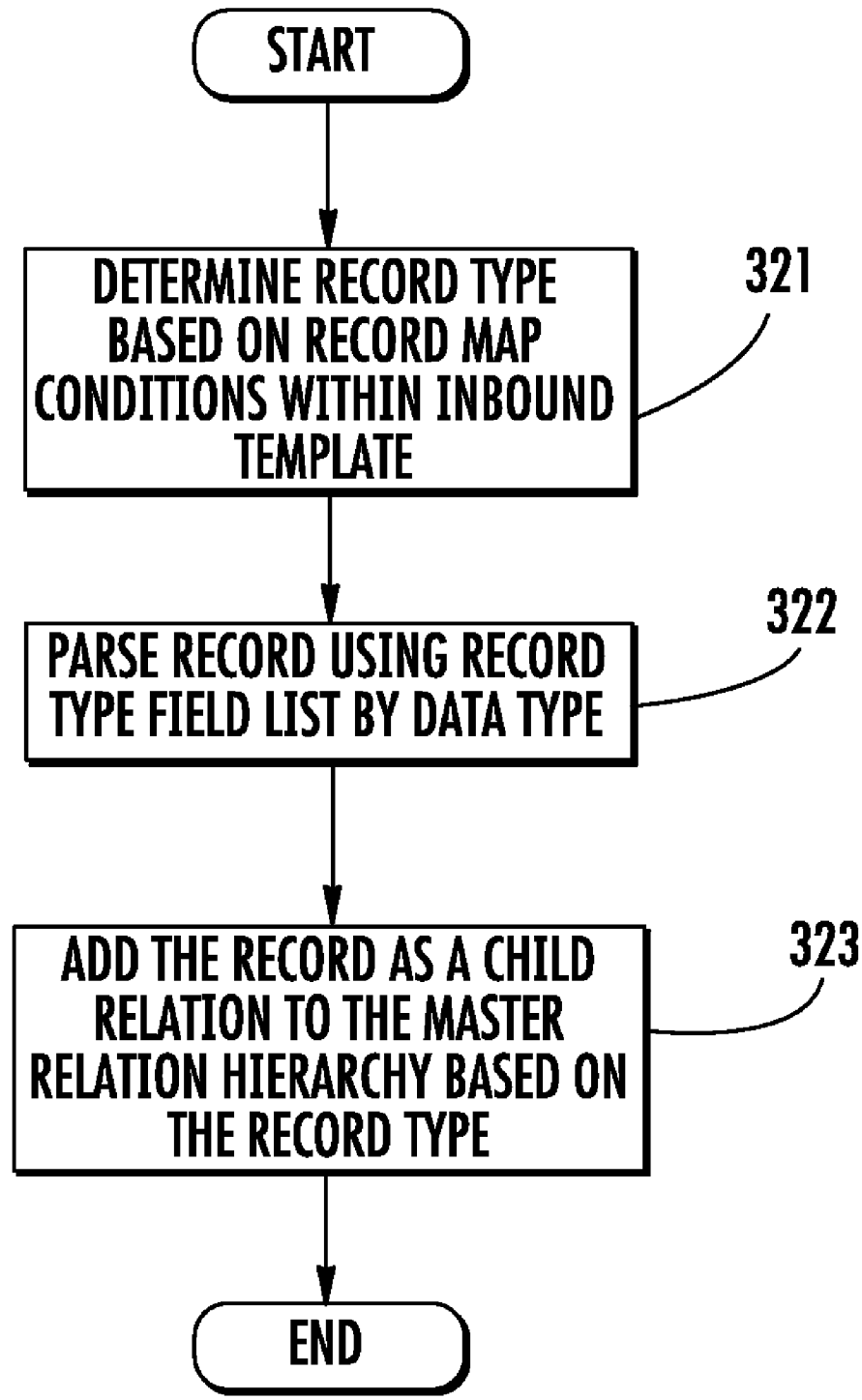
FIG. 11 is a flow diagram of a method of parsing a record for TEI gateway software according to an embodiment of the present invention.

As shown in FIG. 9, to translate (block 300) the data or data set, a data stream is initialized (block 310) as understood by those skilled in the art. To accomplish the initialization, as shown in FIG. 10, an inbound direct mode is determined (block 311). If the inbound is direct mode, then an adapter 69 based on specifications of the Communications 64 is created (block 313). If not, then a file adapter is created that points to an inbound queue location (block 312). If the communication has synchronous response (block 314), then the adapter 69 is added to the synchronous adapter map. If not, then a data collector is immediately obtained from the adapter 69 (block 316). A determination is made as to which inbound template 61 to use to parse the data based on the inbound condition (block 317). The inbound template 61 is read (block 318) and the outbound template 63 is read and added to the outbound template map (block 319). The data is then returned (block 320) back to call send data (block 150) (see FIG. 7). To parse a record as referenced in block 317 and 320, a record type is determined based on record map conditions within the inbound template (block 321), and the record is parsed using record type fields listed by data type (block 322), as understood by those skilled in the art. The record is then added to a master relation hierarchy based on the record type (block 323) (see FIG. 11).

Figure 12:
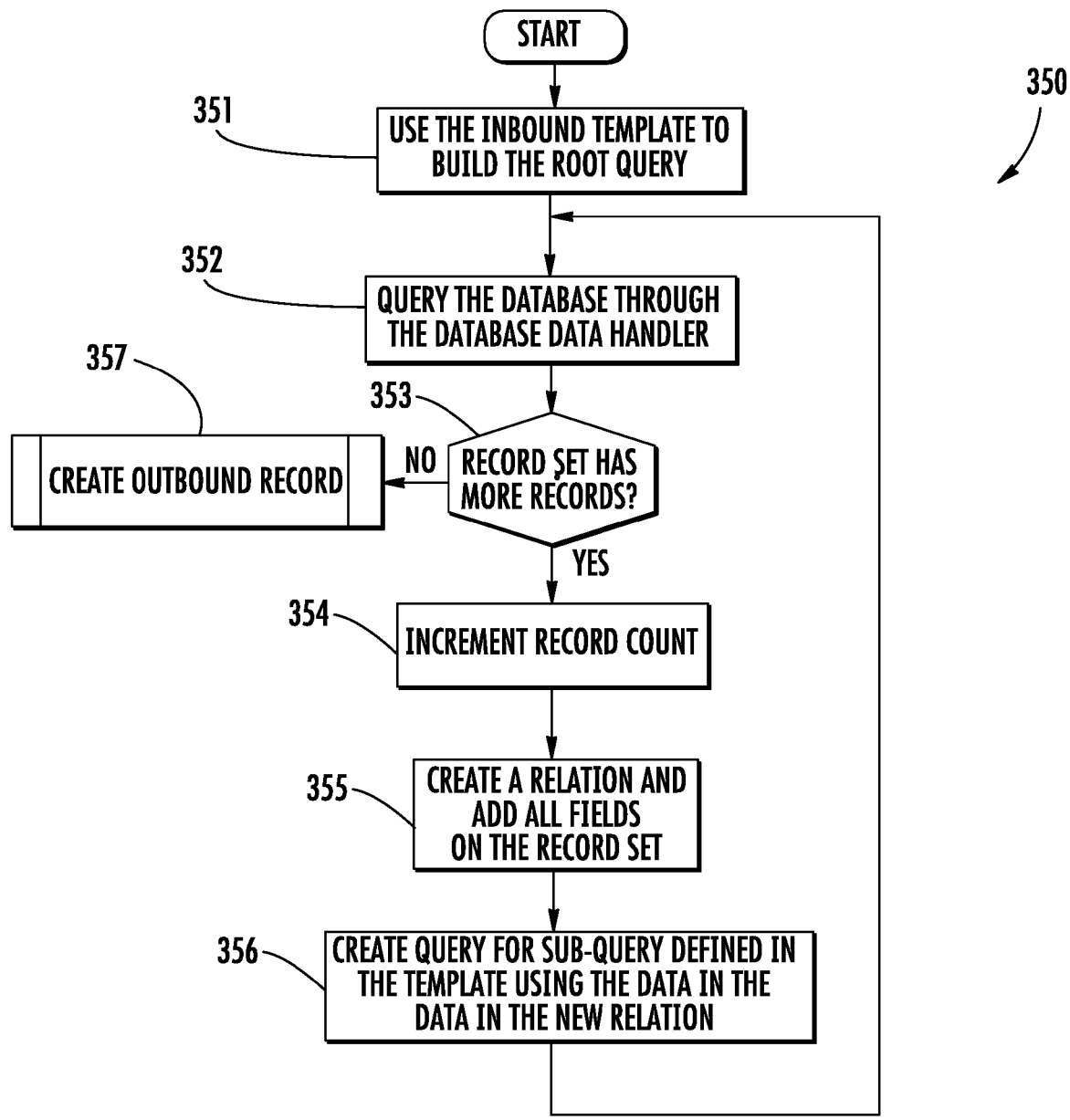
FIG. 12 is a flow diagram of a method of processing database data for TEI gateway software according to an embodiment of the present invention.

As shown in FIG. 12, to parse database data, the inbound template 61 is used to build a root query (block 351). A database data handler can be used to query the database (block 352) and a determination made on whether the record set has more records (block 353). If yes, then a record count is incremented (block 353), a relation is created and all fields are added on the record set (block 355). A query for a sub-query defined in the template can be created using the data in the new relation (block 356). If no more records occur, then an outbound record is then created (block 357).

Figure 13:
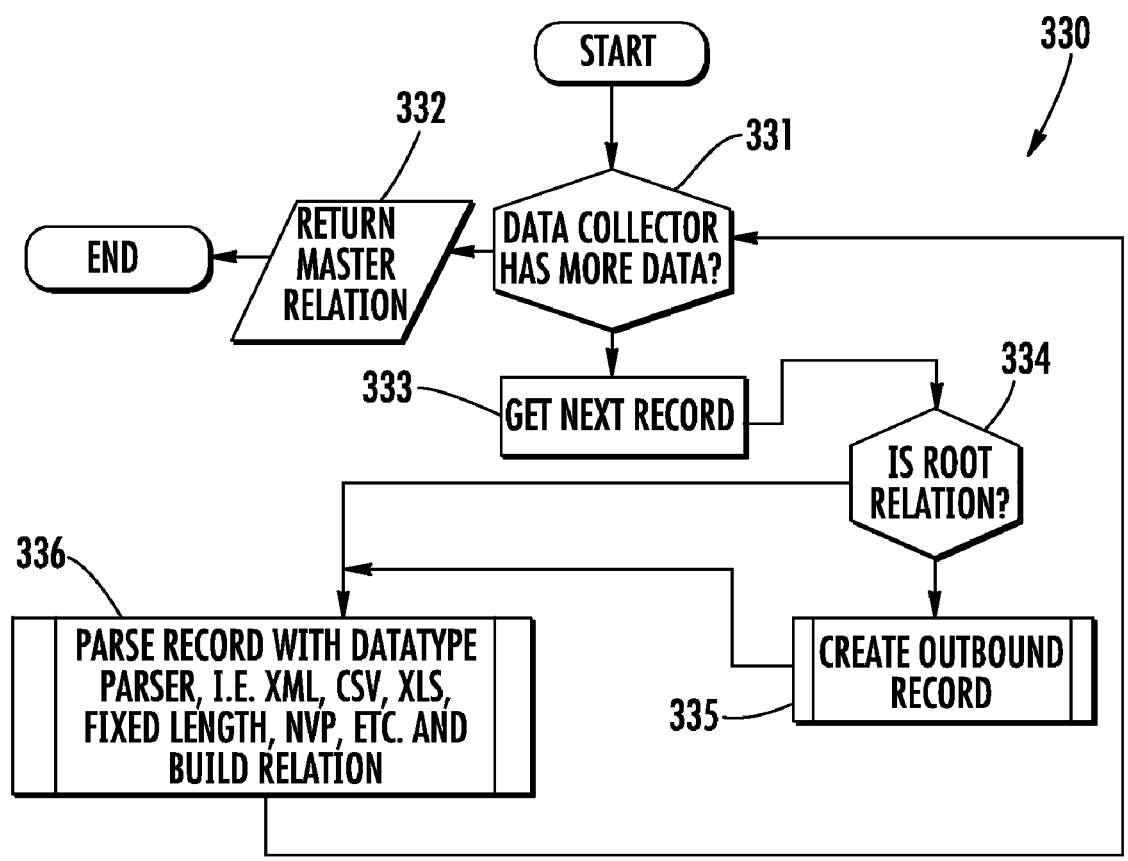
FIG. 13 is a flow diagram of a method of processing database data for TEI gateway software according to an embodiment of the present invention.

As shown in block 316 and FIG. 10 and the method 350 of FIG. 13, a determination is made whether the data collector has more data (block 331). If no, then return is made to the master relation (block 332). If more data is in the data collector, however, the next record is obtained (block 333) and a root relation is determined (block 334). If yes, then an outbound record is created (block 335). If no, or after creating an outbound record, the record is parsed with a data type parser, i.e., XML, CSV, XLS, fixed length, MVP, etc., and a relation is built (block 336). This is repeated until the data collector has no more data.

Figure 14:
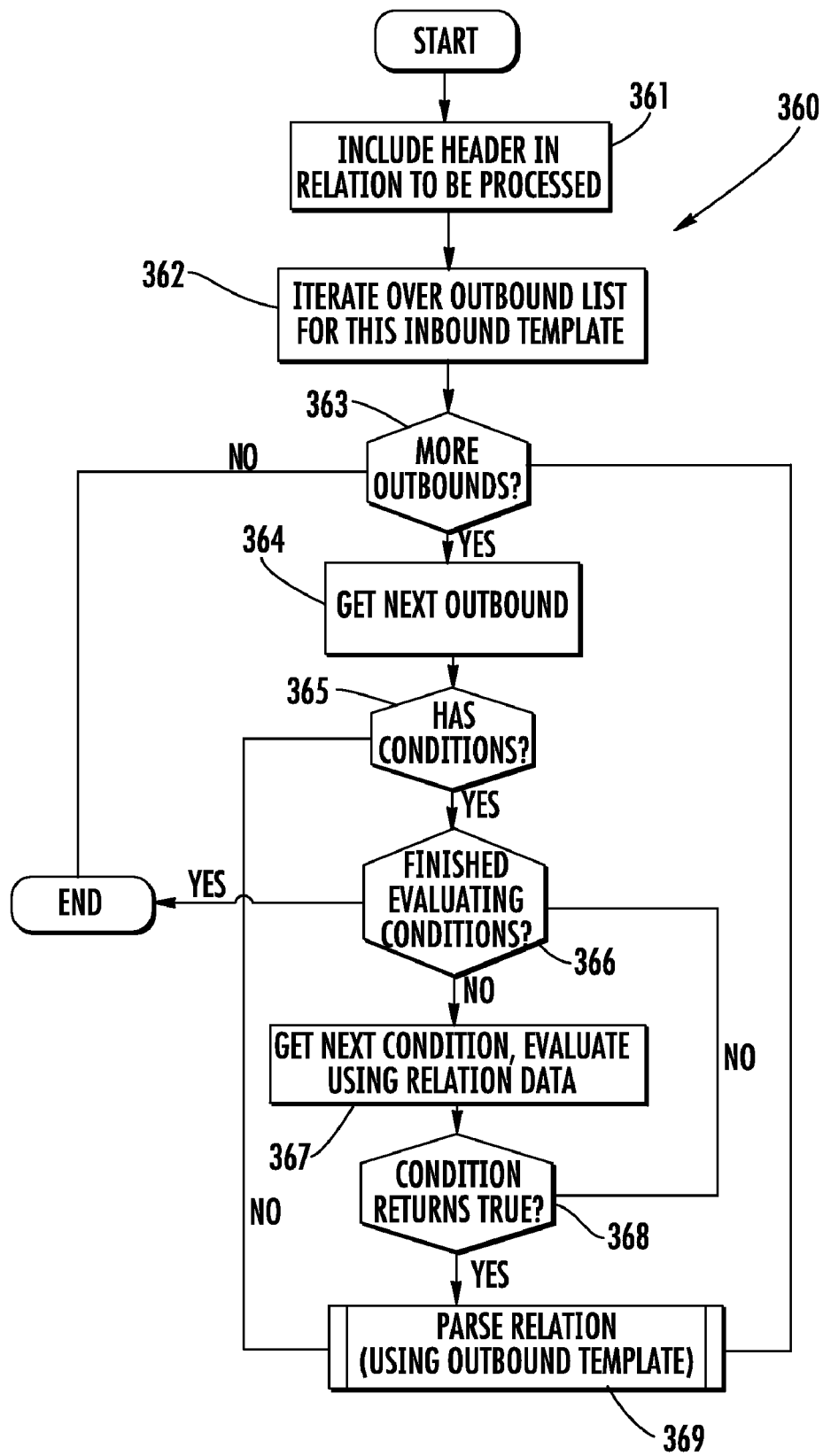
FIG. 14 is a flow diagram of a method of creating an outbound record for TEI gateway software according to an embodiment of the present invention.

To create an outbound record as shown in block 357 of FIG. 12 and block 335 of FIG. 13, a method 360 such as shown in FIG. 14 can be used. A header is included in the relation to be processed (block 361) and an iteration occurs over the outbound list for this inbound template 61 (block 362). If more outbound are available (block 363), then the next one is obtained (block 364). If the outbound has no conditions (block 365), then the relation is parsed using the outbound template (block 369). If conditions exist, then these conditions are evaluated (block 366). If the evaluation is not finished, then the next condition is obtained to evaluate using relation data (block 367). If the evaluation is complete, then a condition is determined to be true (block 368). If not, then evaluation continues. If yes, then a parse relation is initiated (block 369).

Figure 15:
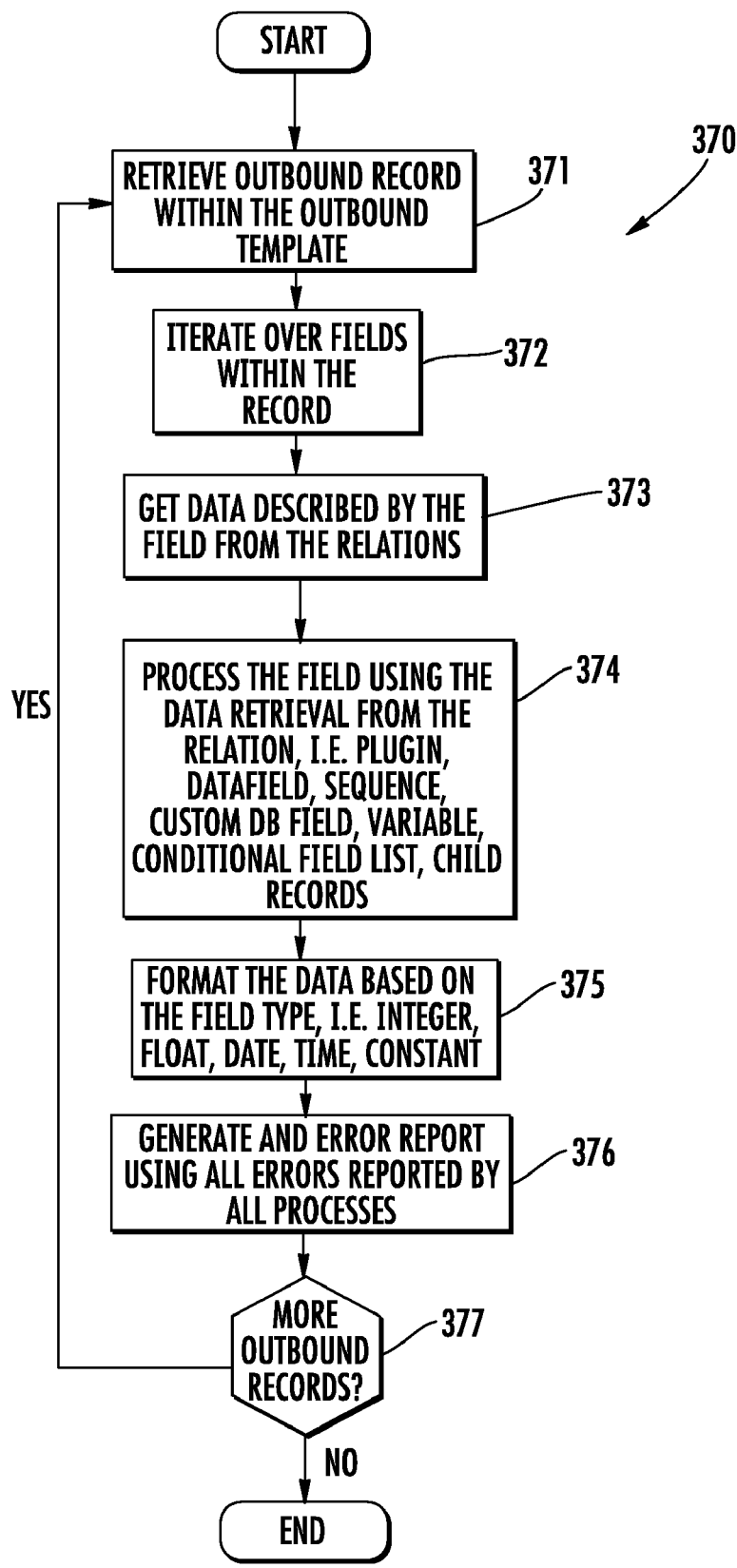
FIG. 15 is a flow diagram of a method for parsing a relation among data for TEI gateway software according to an embodiment of the present invention.

As shown by the method 370 to parse a relation in FIG. 15, an outbound record is retrieved from within the outbound template (block 372). Iteration over the fields within the record (block 372) can occur, and data can be obtained as described by the field from the relations (block 373). The field can be processed using the data retrieval from the relation, i.e., plug-in, data field, sequence, custom database field, variable, conditional field and child records (block 374) as understood by those skilled in the art. The data is formatted based on the field type, i.e., integer, float, date, time, or constant (block 375), and an error report can be generated using all errors reported by all processors (block 376). If more outbound records (block 377), then the process is repeated.

Figure 16:
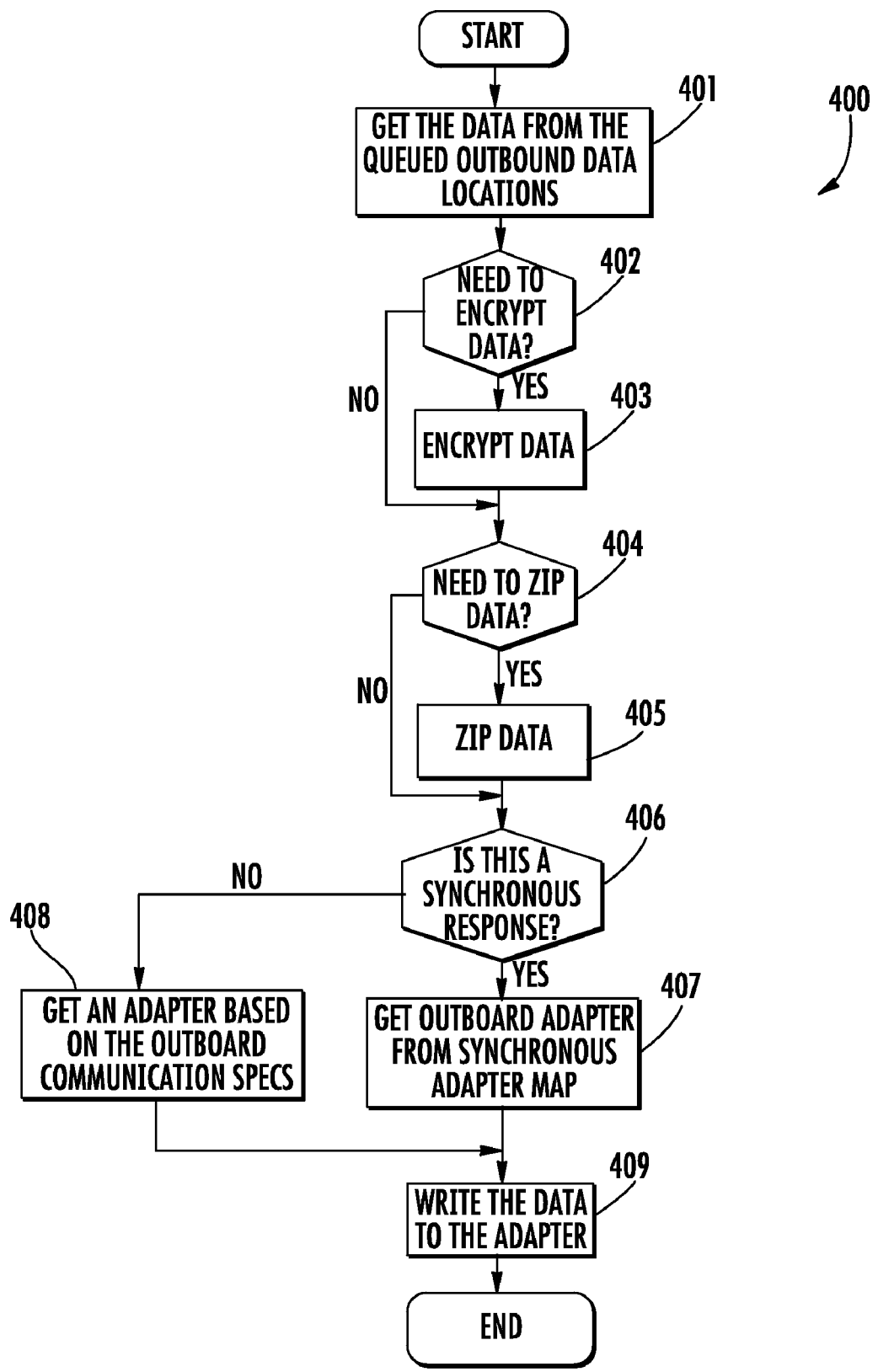
FIG. 16 is a flow diagram of a method of sending data for TEI gateway software according to an embodiment of the present invention.

As shown in FIG. 16, to send data (block 400), the data from the queued outbound data locations is obtained (block 401), and a determination is made on whether to encrypt the data (block 402). If yes, then the data is encrypted (block 403) as understood by those skilled in the art. A determination is also made on whether the data needs to be zipped (block 404) or compressed. If so, then the data is zipped (block 405), and a determination is made as to whether the response is synchronous (block 406). If not, then an adapter 69 based on the outbound communication specifications is obtained (block 408). If so, then an outbound adapter 69 is obtained from a synchronous adapter map (block 407), and the data is written to the adapter 69 (block 409).

Figure 17:
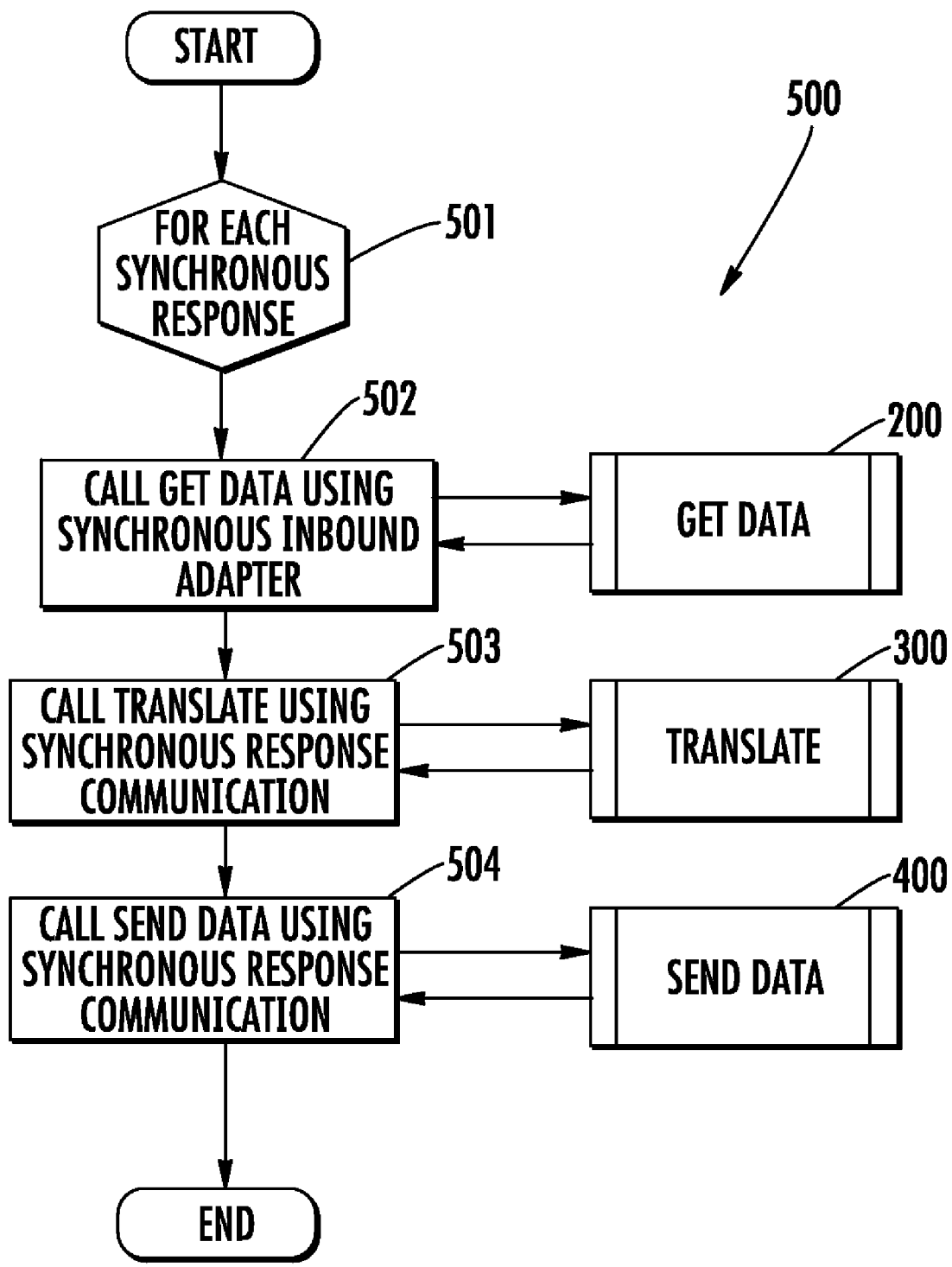
FIG. 17 is a flow diagram of a method of processing a synchronous response according to an embodiment of the present invention.

To process synchronous response data (block 160) a process response (block 500) as shown in FIG. 17 can be used, for example. For each synchronous response (block 501), call get data using a synchronous inbound adapter (block 502) can be used and data obtained (block 200) as described above. Likewise, translate can be called using a synchronous response communication (block 503) to translate (block 300). Call send data uses a synchronous response (block 504) for send data (block 400).

Figure 7:
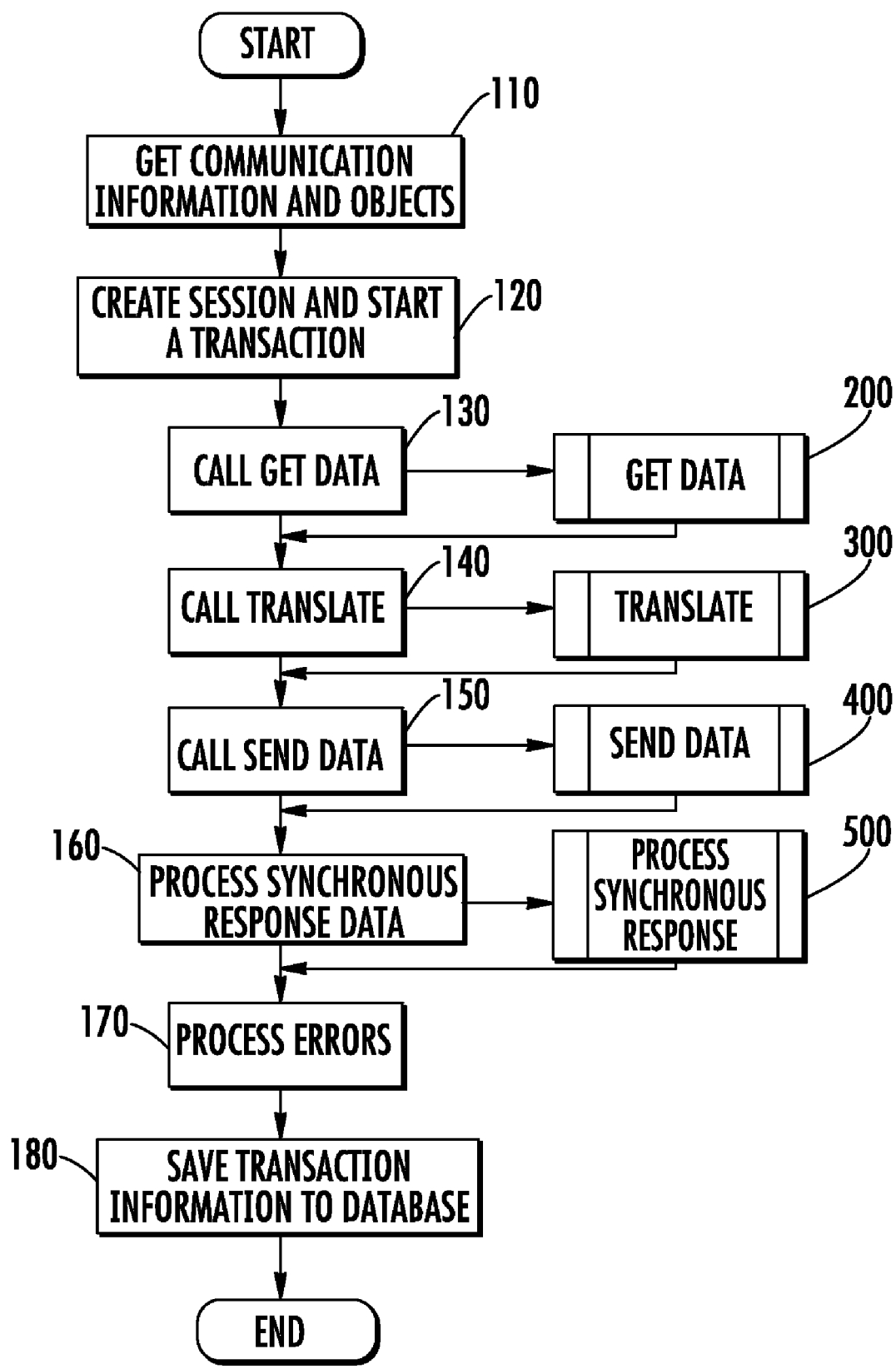
FIG. 7 is a flow diagram of a method of communicating for TEI gateway software according to an embodiment of the present invention.
Figure 8:
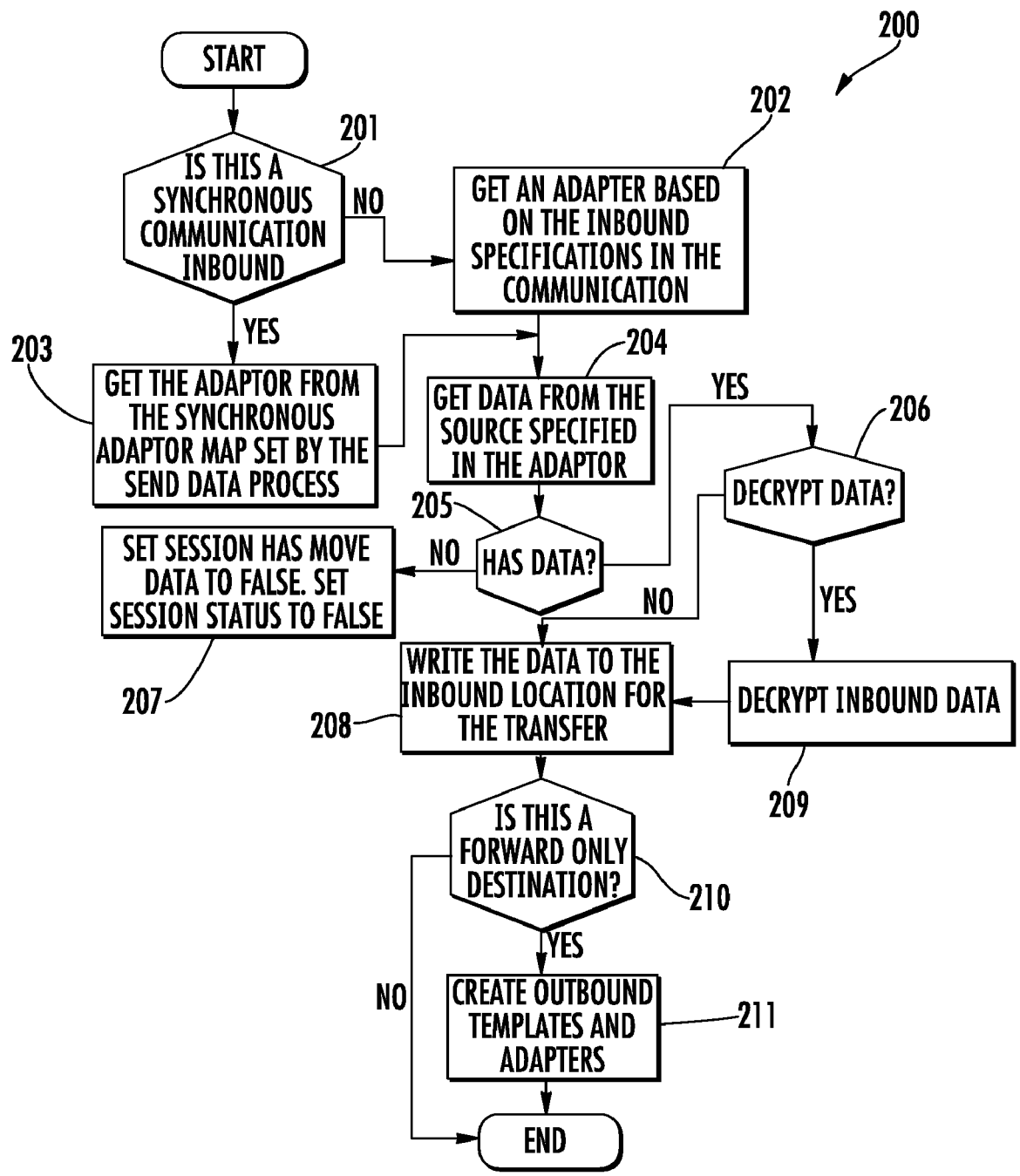
FIG. 8 is a flow diagram of a method of getting data for TEI gateway software according to an embodiment of the present invention.
Figure 18:
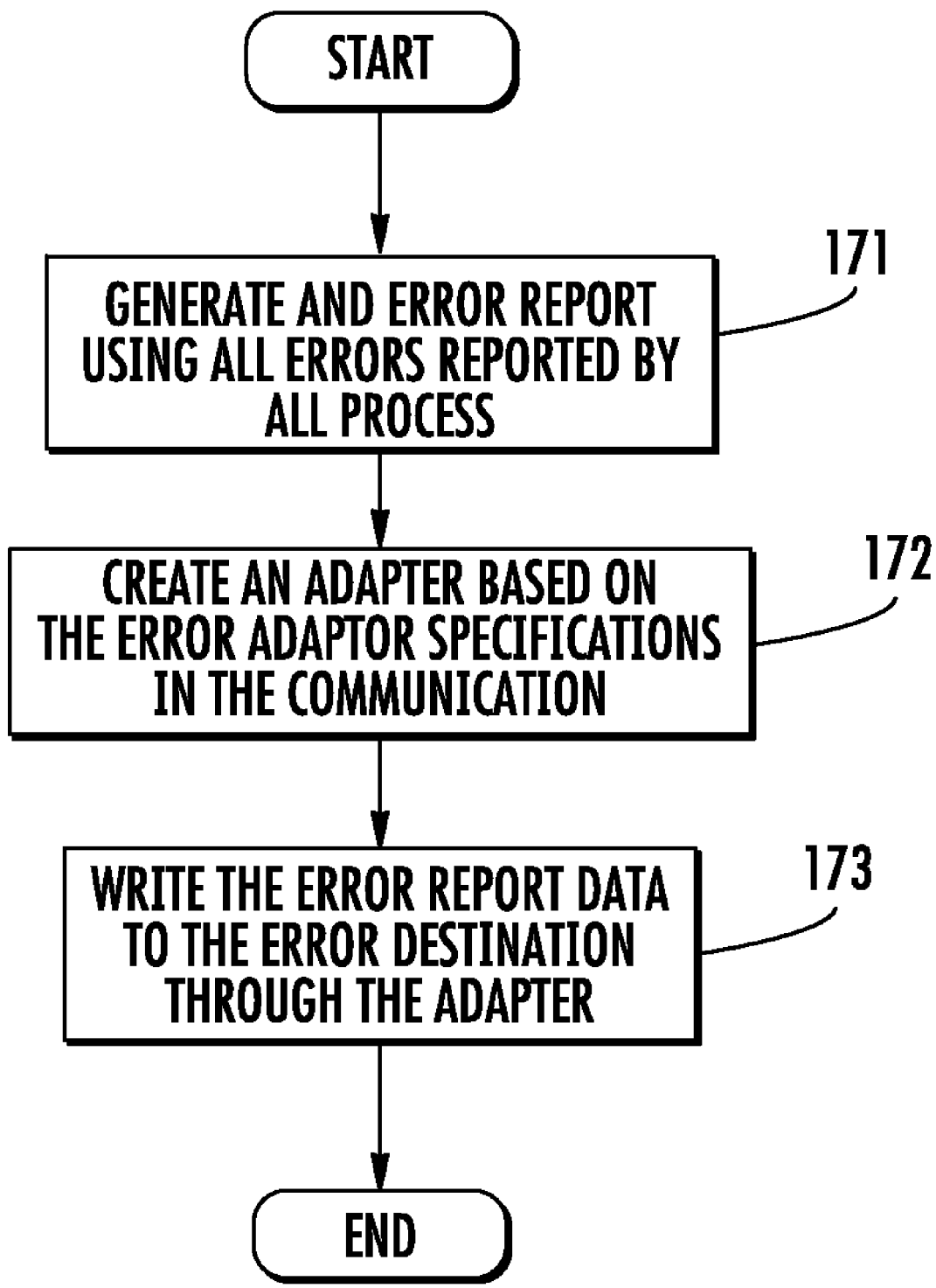
FIG. 18 is a flow diagram of a method of processing errors for TEI gateway software according to an embodiment of the present invention.
Figure 19:
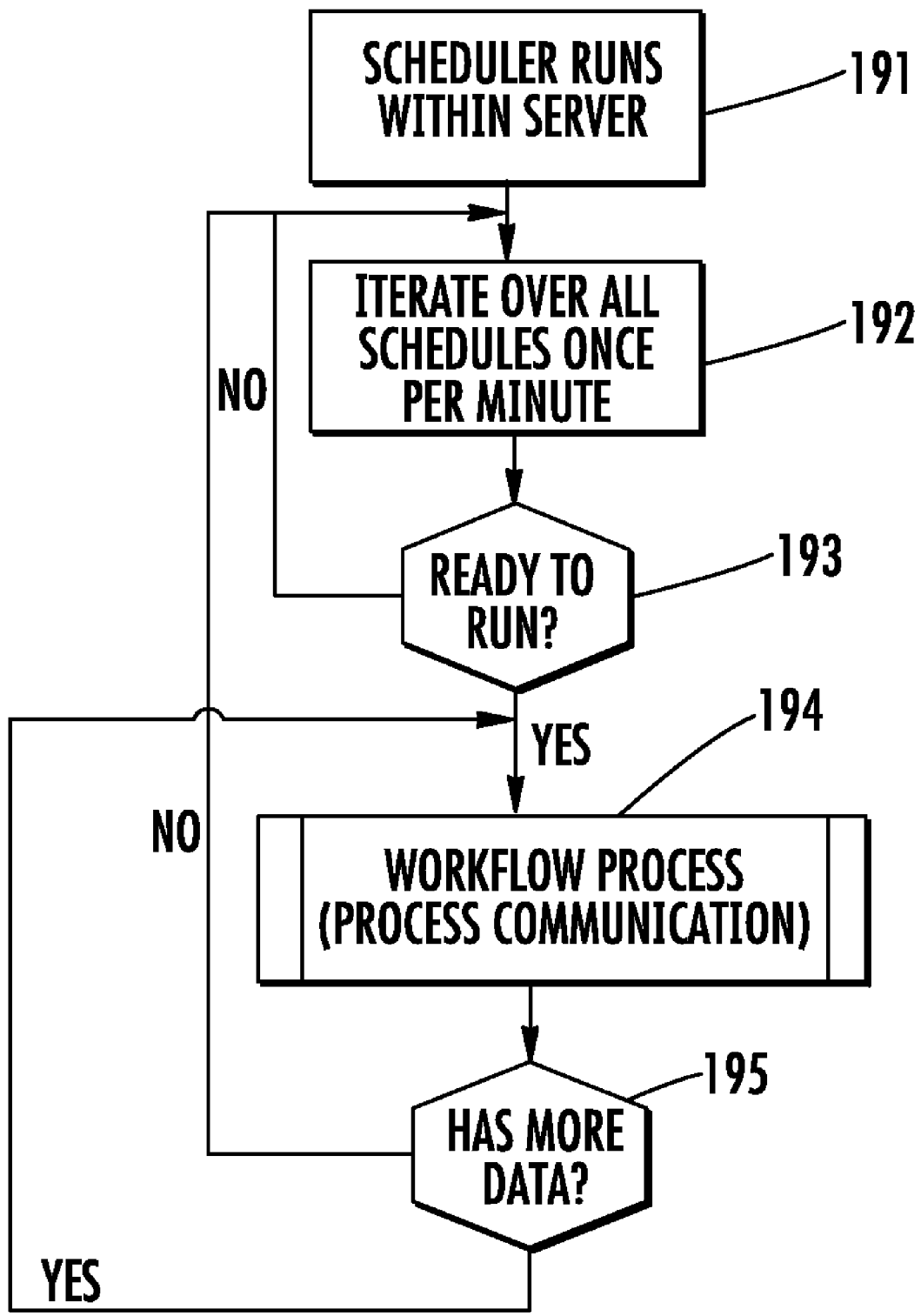
FIG. 19 is a flow diagram of a method of scheduling for TEI gateway software according to an embodiment of the present invention.
Figure 20:
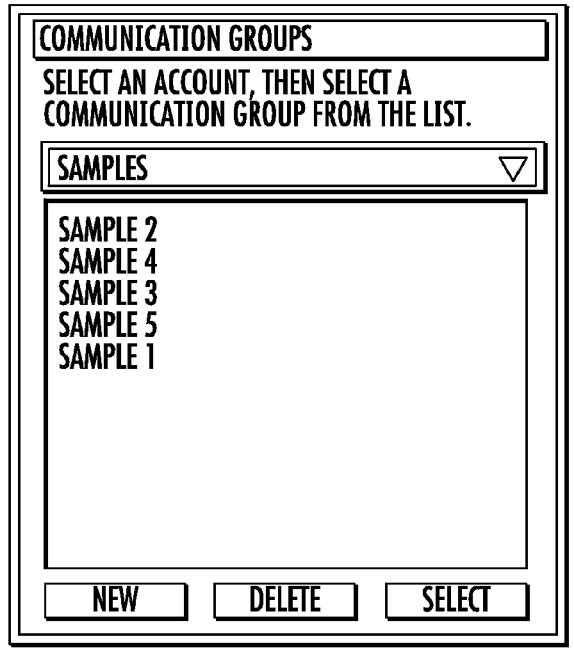
FIG. 20 is a schematic view of a graphical user interface to select a communication group for TEI gateway software according to an embodiment of the present invention.

To process errors (block 170) as shown in FIG. 7, the method shown in FIG. 18, for example, can be used. An error report is generated using all errors reported by all processes (block 171) and an adapter created based on the error adapter specification in the Communications (block 172). The error report data is then written to the error destination through the adapter 69 (block 173). Once the errors have been processed (block 170), the transaction information can be saved in a database (block 180).

For the scheduler 89, it can run with the server 58 (block 191) as with the transaction manager controller and on the associated data terminals 56, 40 as needed or desired. The schedules can be iterated once per minute (block 192), and determinations made on whether transactions are ready to run (block 193). If so, then a communication is processed (block 194) as shown in FIG. 7 until complete. Then a determination of whether more data is available (block 195) is made.

This application is related to co-pending non-provisional patent application U.S. Ser. No. 10/457,832 filed on Jun. 9, 2003 which is a continuation in part of U.S. Non-Provisional application Ser. No. 10/456,293 filed on Jun. 6, 2003, which claims the priority of provisional patent application U.S. Ser. No. 60/387,097, filed Jun. 7, 2002, and titled "System, Method and System for Electronic Data Interchange Among Multiple Data Sources," each of which are incorporated herein by reference in their entireties.

In the drawings and specification, there have been disclosed typical embodiments of the invention and, although specific terms are employed, they are used in a generic and descriptive sense only and not for the purpose of limitation, the scope of the invention being set forth in the following claims.

That claimed is:

1. A computer memory storing transformation and exchange gateway software for execution by a computer, the software comprising:

a mapper to map connection data path instructions;

a plurality of inbound templates each to provide inbound data processing instructions for an inbound data set having one of a plurality of inbound data interchange protocols, each of the plurality of inbound templates defining an input positioned in communication with at least one server to selectively define a respective one of the inbound data interchange protocols prior to receiving the inbound data;

at least one outbound template to provide outbound data processing instructions for an outbound data set having one of a plurality of outbound data interchange protocols different from the inbound data interchange protocols, the at least one outbound template defining an output positioned in communication with at least one remote terminal to selectively define a respective one of the output data interchange protocols prior to sending the outbound data; and a data transformation and exchange engine in communication with the mapper to locate a data path and determine a select one of the plurality of inbound templates to use for inbound data processing instructions, in communication with the select one of the plurality of inbound templates to process the inbound data set responsive to the inbound data processing instructions of the select one of the plurality of inbound templates and thereby transform the inbound data set to the outbound data set, and in communication with the at least one outbound template to send the outbound data set with the one of the plurality of outbound data interchange protocols responsive to the outbound data processing instructions of the at least one outbound template.

2. The computer memory as defined in claim 1, further comprising a scheduler in communication with the mapper to schedule timing for making a connection to an entity having the inbound data set and connection instructions to connect to the entity having the inbound data set.

3. The computer memory as defined in claim 1, further comprising a set of graphical user interface (GUI) tools in communication with the data transformation and exchange engine to interface with a user, the GUI tools including an inbound template GUI to select the inbound data processing instructions and thereby define parameters for the inbound data set and an outbound template GUI to select the outbound data processing instructions and thereby define parameters for the outbound data set.

4. The computer memory as defined in claim 1, wherein each of the plurality of inbound templates comprises:
 template header information;
 a plurality of inbound records each including create header information, new body record information, and create trailer information;
 data type information; and
 root element name information.

5. The computer memory as defined in claim 1, wherein the at least one outbound template comprises:
 template header information;
 data type information;
 field delimiter information; and
 record delimiter information.

6. The computer memory as defined in claim 3, wherein each of the plurality of inbound templates comprises:
 template header information;
 a plurality of inbound records each including create header information, new body record information, and create trailer information;
 data type information; and
 root element name information.

7. The computer memory as defined in claim 3, wherein the information provided for each of the plurality of inbound templates is utilized by the set of GUI tools to create a display of the respective inbound templates on a display for viewing by a user.

8. The computer memory as defined in claim 3, wherein at least one of the plurality of inbound templates is utilized to build a root query to query a database.

9. The computer memory as defined in claim 8, wherein, based on the root query, the data transformation and exchange engine determines whether or not a matching record exists in the database, and if so, a record count is incremented, and if not, an outbound record is created.

10. A method for data connectivity, the method comprising:
 mapping, utilizing a mapper, connection data path instructions;
 utilizing a plurality of inbound templates each to provide inbound data processing instructions for an inbound data set having one of a plurality of inbound data interchange protocols, each of the plurality of inbound templates defining an input positioned in communication with at least one server to selectively define a respective one of the inbound data interchange protocols prior to receiving the inbound data;
 utilizing at least one outbound template to provide outbound data processing instructions for an outbound data set having one of a plurality of outbound data interchange protocols different from the inbound data interchange protocols, the at least one outbound template defining an output positioned in communication with at least one remote terminal to selectively define a respective one of the output data interchange protocols prior to sending the outbound data;
 locating, using a data transformation and exchange engine in communication with the mapper, a data path and determining a select one of the plurality of inbound templates to use for inbound data processing instructions, in communication with the select one of the plurality of inbound templates to process the inbound data set responsive to the inbound data processing instructions of the select one of the plurality of inbound templates, and thereby transforming the inbound data set to the outbound data set; and
 in communication with the at least one outbound template, sending the outbound data set with the one of the plurality of outbound data interchange protocols responsive to the outbound data processing instructions of the at least one outbound template.

11. The method as defined in claim 10, further comprising:
 utilizing a scheduler in communication with the mapper to schedule timing for making a connection to an entity having the inbound data set and connection instructions to connect to the entity having the inbound data set.

12. The method as defined in claim 10, further comprising:
 utilizing a set of graphical user interface (GUI) tools in communication with the data transformation and exchange engine to interface with a user, the GUI tools including an inbound template GUI to select the inbound data processing instructions and thereby define parameters for the inbound data set and an outbound template GUI to select the outbound data processing instructions and thereby define parameters for the outbound data set.

13. The method as defined in claim 10, wherein each of the plurality of inbound templates comprises:
 template header information;
 a plurality of inbound records each including create header information, new body record information, and create trailer information;
 data type information; and
 root element name information.

14. The method as defined in claim 10, wherein the at least one outbound template comprises:
 template header information;
 data type information;
 field delimiter information; and
 record delimiter information.

15. The method as defined in claim 12, wherein each of the plurality of inbound templates comprises:
 template header information;
 a plurality of inbound records each including create header information, new body record information, and create trailer information;
 data type information; and
 root element name information.

16. The method as defined in claim 15, wherein the information provided for each of the plurality of inbound templates is utilized by the set of GUI tools to create a display of the respective inbound templates on a display for viewing by a user.

17. The method as defined in claim 15, wherein at least one of the plurality of inbound templates is utilized to build a root query to query a database.

18. The method as defined in claim 17, wherein, based on the root query, the data transformation and exchange engine determines whether or not a matching record exists in the database, and if so, a record count is incremented, and if not, an outbound record is created.

* * * * *